US012535985B2

(12) United States Patent
Xu et al.

(10) Patent No.: US 12,535,985 B2
(45) Date of Patent: Jan. 27, 2026

(54) DISPLAY METHOD FOR WATCH-FACE INTERFACE AND ELECTRONIC DEVICE

(71) Applicant: Huawei Technologies Co., Ltd., Shenzhen (CN)

(72) Inventors: Bei Xu, Xi'an (CN); Zhanrong Mu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/024,532

(22) Filed: Jan. 16, 2025

(65) Prior Publication Data
US 2025/0173115 A1 May 29, 2025

Related U.S. Application Data

(63) Continuation of application No. PCT/CN2023/121058, filed on Sep. 25, 2023.

(30) Foreign Application Priority Data

Oct. 26, 2022 (CN) .......................... 202211319648.6

(51) Int. Cl.
G06F 3/14 (2006.01)
G06F 1/16 (2006.01)
G06F 3/01 (2006.01)

(52) U.S. Cl.
CPC ............ *G06F 3/1462* (2013.01); *G06F 1/163* (2013.01); *G06F 3/011* (2013.01); *G06F 3/017* (2013.01)

(58) Field of Classification Search
CPC ........ G06F 3/1462; G06F 1/163; G06F 3/011; G06F 3/017; G06F 2203/011;
(Continued)

(56) References Cited

U.S. PATENT DOCUMENTS 9,454,230 B2 * 9/2016 Matsuki ................. H04N 23/69
2007/0025722 A1 * 2/2007 Matsugu ................ G03B 17/16
348/E5.042

(Continued)

FOREIGN PATENT DOCUMENTS

CN 104731829 A 6/2015
CN 108845741 A 11/2018
(Continued)

OTHER PUBLICATIONS

"PhotoSpeak from MotionPortrait makes static portraits move and interact with the user, what is the 3D interaction technology used?", https://www.zhihu.com/question/20268847, Feb. 11, 2025, May 31, 2012, total 2 pages.

(Continued)

*Primary Examiner* — Dmitriy Bolotin
(74) *Attorney, Agent, or Firm* — Slater Matsil, LLP

(57) ABSTRACT

An electronic device acquires a first expression image of a user in response to a first trigger operation and obtains a target image. Then, the electronic device sends an image generation request to a server. The image generation request includes the target image and initial expression information of the first expression image. The server generates a dynamic-effect file corresponding to the target image in response to the image generation request. The dynamic-effect file includes a dynamic-effect image obtained by rendering the target image based on the initial expression information. The server sends the dynamic-effect file to the wearable device. The wearable device displays a corresponding watch-face interface based on an acquired second expression image after detecting a second trigger operation. The watch-face interface includes the dynamic-effect image that matches an expression type of the second expression image.

20 Claims, 25 Drawing Sheets

(58) Field of Classification Search
CPC .......... G06F 2200/1614; G06F 1/1694; G06F 3/0481; G06F 3/0482; G06F 9/451; G06F 3/0484; G04G 9/0064; G04G 9/007; G04G 21/00; G04G 99/00; H04L 67/12; H04L 67/34; H04L 67/06; G06V 40/174; G06V 40/16
See application file for complete search history.

(56) References Cited

U.S. PATENT DOCUMENTS

| | | | | |
|---|---|---|---|---|
| 2016/0328877 | A1* | 11/2016 | Cui | G06F 3/0482 |
| 2018/0299836 | A1 | 10/2018 | Qian et al. | |
| 2020/0058128 | A1* | 2/2020 | Choi | G06T 7/55 |
| 2022/0300251 | A1* | 9/2022 | Wang | G06T 11/203 |
| 2023/0359320 | A1* | 11/2023 | Huang | G06F 1/1654 |
| 2024/0406540 | A1* | 12/2024 | Dong | G06F 3/0488 |
| 2024/0419297 | A1* | 12/2024 | Wang | G06F 9/451 |
| 2025/0173115 | A1* | 5/2025 | Xu | G06F 3/017 |
| 2025/0284251 | A1* | 9/2025 | Liao | G06F 3/16 |

FOREIGN PATENT DOCUMENTS

| | | | |
|---|---|---|---|
| CN | 109525483 A | 3/2019 | |
| CN | 113031769 A | 6/2021 | |

OTHER PUBLICATIONS

"Face fusion black technology, revealing the appearance of future generations", https://aistudio.baidu.com/aistudio/projectdetail/2254031, Feb. 11, 2025, Aug. 4, 2021, total 9 pages.

\* cited by examiner

DISPLAY METHOD FOR WATCH-FACE INTERFACE AND ELECTRONIC DEVICE

CROSS-REFERENCE TO RELATED APPLICATIONS

This application is a continuation of International Application No. PCT/CN2023/121058, filed on Sep. 25, 2023, which claims priority to Chinese Patent Application No. 202211319648.6, filed on Oct. 26, 2022. The disclosures of the aforementioned applications are hereby incorporated by reference in their entireties.

TECHNICAL FIELD

This application relates to the field of terminal technologies, and in particular, to a display method for a watch-face interface and an electronic device.

BACKGROUND

With rapid development of artificial intelligence technologies, people's pursuit of intelligence, function diversification, and humanization of life styles is becoming increasingly high. As a new type of wearable device, smartwatches are widely used by people. A user may wear a smartwatch to view or listen to a notification message, a reminder message, and the like, or may listen to music, listen to a book, and the like, or may further control some smart voice assistants, and the like.

Usually, a watch face of the smartwatch is electronically displayed. The user may manually set a watch-face interface according to a use requirement of the user, to switch content displayed in the watch face. The watch-face interface set by the user may include a time watch-face interface, a date watch-face interface, a system background watch-face interface, and the like. Styles of the watch-face interface are simple and lack diversity, leading to poor user experience of using the smartwatch.

SUMMARY

Embodiments of this application provide a display method for a watch-face interface and an electronic device, so that a watch-face interface corresponding to a smartwatch can be customized based on feature information corresponding to a user, and when the user uses the smartwatch, a corresponding watch-face interface is presented based on feature information of the user at a current moment. The user can customize a watch face to improve user experience.

To achieve the foregoing objectives, the following technical solutions are used in embodiments of this application.

According to a first aspect, a display method for a watch-face interface is provided, applied to an interaction system. The interaction system includes a wearable device, an electronic device, and a server. The wearable device is configured to display a watch-face interface. The method includes: The electronic device acquires a first expression image of a user in response to a first trigger operation. Then, the electronic device obtains a target image. The electronic device sends an image generation request to the server. The image generation request includes the target image and initial expression information of the first expression image, and the initial expression information represents an expression type of the first expression image. The server generates a dynamic-effect file corresponding to the target image in response to the image generation request. The dynamic-effect file includes a dynamic-effect image obtained by rendering the target image based on the initial expression information, and dynamic effect of the dynamic-effect image matches the expression type of the first expression image. The server sends the dynamic-effect file to the wearable device. The wearable device displays a corresponding watch-face interface based on an acquired second expression image after detecting a second trigger operation. The watch-face interface includes the dynamic-effect image that matches an expression type of the second expression image.

It can be learned that the electronic device sends the first expression image of the user and the selected target image to the server. The server generates a dynamic-effect file corresponding to the target image. Dynamic effect corresponding to the dynamic-effect image in the dynamic-effect file matches the expression type of the first expression image. In addition, the server returns the dynamic-effect file to the wearable device. The wearable device displays the watch-face interface based on the acquired second expression image. The dynamic-effect image in the watch-face interface matches the expression type of the second expression image. In this application, a dynamic-effect image corresponding to the target image may be customized based on an expression of the user, and when the user uses the wearable device, a watch-face interface including the dynamic-effect image may be displayed based on a current expression of the user, where the dynamic-effect image matches the current expression of the user. This increases interest of the user in using the wearable device, and improves user experience.

In a feasible implementation of the first aspect, a process in which the wearable device displays a corresponding watch-face interface based on an acquired second expression image after detecting a second trigger operation includes: The wearable device acquires the second expression image of the user after detecting the second trigger operation. Then, the wearable device recognizes the expression type of the second expression image. In addition, the wearable device displays the corresponding watch-face interface based on target expression information, where the target expression information represents the expression type of the second expression image.

It can be learned that after detecting the second trigger operation, the wearable device in this embodiment of this application acquires the second expression image of the user, and displays the corresponding watch-face interface based on the target expression information of the second expression image. The target expression information represents the expression type of the second expression image. Therefore, in a process of displaying the watch-face interface, the wearable device may display a corresponding watch-face interface based on a current expression of the user. This improves interaction and interest between the user and the wearable device, and avoids a single style of the watch-face interface.

In a feasible implementation of the first aspect, in a process in which the wearable device displays the watch-face interface based on the acquired second expression image, the wearable device compares the target expression information of the second expression image with effect information of the dynamic-effect image, where the effect information represents an expression type in the dynamic-effect image. A watch-face interface including the dynamic-effect image is displayed if the target expression information of the second expression image matches the effect information of the dynamic-effect image.

It can be learned that in a process of displaying the watch-face interface based on the acquired second expression image, the wearable device compares the target expression information of the second expression image with the effect information of the dynamic-effect image. A watch-face interface including the dynamic-effect image is displayed in a case in which the target expression information of the second expression image matches the effect information of the dynamic-effect image. The wearable device may display, based on the target expression information, a watch-face interface that matches a user expression, and provide a personalized dynamic watch-face interface for the user, thereby improving user experience.

In a feasible implementation of the first aspect, the method further includes: displaying a watch-face interface including the target image if the target expression information of the second expression image does not match the effect information of the dynamic-effect image.

It can be learned that in a process in which the wearable device displays the watch-face interface based on the acquired second expression image, if the target expression information of the second expression image does not match the effect information of the dynamic-effect image, the wearable device may display a static watch-face interface including the target image. Therefore, when the target expression information of the second expression image does not match the effect information of the dynamic-effect image, the wearable device may still display the watch-face interface including the target image. This avoids displaying a watch-face interface that does not match the user expression. In addition, if the wearable device does not acquire the second expression image of the user, the wearable device can still display the watch-face interface including the target image, thereby improving user experience.

In a feasible implementation of the first aspect, the target expression information and the effect information include feature point information. A process in which the wearable device compares the target expression information of the second expression image with effect information of the dynamic-effect image and displays the watch-face interface includes: The wearable device compares the feature point information of the target expression information with the feature point information of the effect information, where the feature point information represents an expression feature corresponding to an expression type. Further, if the feature point information of the target expression information matches the feature point information of the effect information, it is determined that the target expression information of the second expression image matches the effect information of the dynamic-effect image, and the watch-face interface including the dynamic-effect image is displayed.

It can be learned that, that the target expression information matches the effect information may be determined by comparing the feature point information of the target expression information with the feature point information of the effect information. Different expressions correspond to different feature point information. Therefore, the wearable device may determine a pre-displayed dynamic-effect image by comparing the feature point information of the target expression information with the feature point information of the effect information. The effect information of the dynamic-effect image matches the target expression information of the second expression image. In this way, the watch-face interface that matches the user expression is displayed, thereby improving interaction and interest between the user and the wearable device.

In a feasible implementation of the first aspect, the target expression information and the effect information include expression type identifiers. A process in which the wearable device compares the target expression information of the second expression image with effect information of the dynamic-effect image and displays the watch-face interface includes: The wearable device compares the expression type identifier of the target expression information with the expression type identifier of the effect information. Further, if the expression type identifier of the target expression information matches the expression type identifier of the effect information, it is determined that the target expression information of the second expression image matches the effect information of the dynamic-effect image, and the watch-face interface including the dynamic-effect image is displayed.

It can be learned that, that the target expression information matches the effect information may be determined by comparing the expression type identifier of the target expression information with the expression type identifier of the effect information. Different expressions correspond to different expression type identifiers. Therefore, the wearable device may determine a pre-displayed dynamic-effect image by comparing the expression type identifier of the target expression information with the expression type identifier of the effect information. The effect information of the dynamic-effect image matches the target expression information of the second expression image. In this way, the watch-face interface that matches the user expression is displayed, thereby improving interaction and interest between the user and the wearable device.

In a feasible implementation of the first aspect, the second trigger operation includes a screen-on operation, and the screen-on operation includes: the user lifts a wrist wearing the wearable device to the front of the user's face, or the user lifts a wrist wearing the wearable device and the user lowers the head.

In a feasible implementation of the first aspect, the first trigger operation includes an enabling operation of the user for a preset working mode of the electronic device, and the preset working mode is used by the electronic device to set a watch-face interface that corresponds to the wearable device and that includes the dynamic-effect image.

It can be learned that the preset working mode is used to set a dynamic watch-face interface that is of the wearable device and that includes the dynamic-effect image. After enabling the preset working mode, the user may set the dynamic watch-face interface including the dynamic-effect image. This improves richness of styles of the watch-face interface, and attracts the user to perform personalized watch-face customization.

In a feasible implementation of the first aspect, the method further includes: displaying a corresponding watch-face interface based on a device status of the wearable device if the device status of the wearable device is a tilted state or a rotation state.

If the wearable device is in the tilted state, the watch-face interface with tilt dynamic effect is displayed. The watch-face interface includes the target image, and the target image presents a tilt change in a horizontal direction and/or a vertical direction within a preset angle.

If the wearable device is in the rotation state, the watch-face interface with rotation dynamic effect is displayed. The watch-face interface includes the target image, and the target image presents a rotation change in a clockwise direction or an anti-clockwise direction.

It can be learned that when the device status of the wearable device is the tilted state or the rotation state, a corresponding watch-face interface may be displayed based on the device status of the wearable device. When the wearable device is in the tilted state, the target image displayed on the watch-face interface presents a tilt change in a horizontal direction and/or a vertical direction within a preset angle. When the wearable device is in the rotation state, the target image displayed on the watch-face interface presents a rotation change in a clockwise direction or an anti-clockwise direction. After detecting the second trigger operation, the wearable device provided in embodiments of this application may display a watch-face interface with different dynamic effect based on the device status, for example, rotation dynamic effect and tilt dynamic effect. This improves interaction and interest between the user and the wearable device, and avoids a single style of the watch-face interface.

In a feasible implementation of the first aspect, displaying the corresponding watch-face interface based on the acquired second expression image if the device status of the wearable device is not the tilted state or the rotation state includes: displaying a watch-face interface with superimposed dynamic effect based on the acquired second expression image if the device status of the wearable device is not the tilted state or the rotation state. The superimposed dynamic effect includes highlight dynamic effect and dynamic effect that matches the expression type of the second expression image. The dynamic-effect image on the watch-face interface presents a cyclic change from expansion to contraction and from contraction to expansion.

It can be learned that, when the device status of the wearable device is not the tilted state or the rotation state, the watch-face interface with the superimposed dynamic effect may be displayed based on the acquired second expression image. The superimposed dynamic effect includes highlight dynamic effect and dynamic effect that matches the expression type of the second expression image. This improves diversity and interest of styles of the watch-face interface and implements a personalized dynamic watch-face interface, thereby improving user experience.

In a feasible implementation of the first aspect, displaying, based on the acquired second expression image, the corresponding watch-face interface including the dynamic-effect image that matches the expression type of the second expression image includes:

displaying a watch-face interface with superimposed dynamic effect based on the acquired second expression image if the wearable device is in the tilted state, where the superimposed dynamic effect includes tilt dynamic effect and dynamic effect that matches the expression type of the second expression image; and the dynamic-effect image displayed on the watch-face interface presents a tilt change in a horizontal direction and/or a vertical direction within a preset angle; and displaying a watch-face interface with superimposed dynamic effect based on the acquired second expression image if the wearable device is in the rotation state, where the superimposed dynamic effect includes rotation dynamic effect and dynamic effect that matches the expression type of the second expression image; and the dynamic-effect image on the watch-face interface presents a rotation change in a clockwise direction or an anti-clockwise direction.

It can be learned that, when the device status of the wearable device is in the tilted state, the watch-face interface with the superimposed dynamic effect may be displayed based on the acquired second expression image. The superimposed dynamic effect includes tilt dynamic effect and dynamic effect that matches the expression type of the second expression image. When the device status of the wearable device is in the rotation state, the watch-face interface with the superimposed dynamic effect may be displayed based on the acquired second expression image. The superimposed dynamic effect includes rotation dynamic effect and dynamic effect that matches the expression type of the second expression image. This improves diversity and interest of styles of the watch-face interface and implements a personalized dynamic watch-face interface, thereby improving user experience.

According to a second aspect, a display method for a watch-face interface is provided, applied to an interaction system. The interaction system includes a wearable device and a server. The method includes: The wearable device acquires a first expression image of a user in response to a first trigger operation. Then, the wearable device obtains a target image and sends an image generation request to the server. The image generation request includes the target image and initial expression information of the first expression image, and the initial expression information represents an expression type of the first expression image. The server generates a dynamic-effect file corresponding to the target image in response to the image generation request. The dynamic-effect file includes a dynamic-effect image obtained by rendering the target image based on the initial expression information, and dynamic effect of the dynamic-effect image matches the expression type of the first expression image. Then, the server sends the dynamic-effect file to the wearable device. The wearable device displays a corresponding watch-face interface based on an acquired second expression image after detecting a second trigger operation. The watch-face interface includes the dynamic-effect image that matches an expression type of the second expression image.

It can be learned that the wearable device may send the first expression image of the user and the selected target image to the server. The server generates a dynamic-effect file corresponding to the target image. Dynamic effect of the dynamic-effect image in the dynamic-effect file matches the expression type of the first expression image. In addition, the server returns the dynamic-effect file to the wearable device. The wearable device displays the watch-face interface based on the acquired second expression image. The dynamic-effect image in the watch-face interface matches the expression type of the second expression image. In this application, a dynamic-effect image corresponding to the target image may be customized based on an expression of the user, and when the user uses the wearable device, a watch-face interface including the dynamic-effect image may be displayed based on a current expression of the user, where the dynamic-effect image matches the current expression of the user. This increases interest of the user in using the wearable device, and improves user experience.

According to a third aspect, a display method for a watch-face interface is provided, applied to an interaction system. The interaction system includes a wearable device, an electronic device, and a server. The method includes: The electronic device sends an image generation request to the server in response to a first trigger operation, where the image generation request includes a target image. Then, the server generates a dynamic-effect file corresponding to the target image in response to the image generation request. The dynamic-effect file includes a dynamic-effect image obtained by rendering the target image based on preset dynamic information. Dynamic effect of the dynamic-effect image matches a dynamic effect type, and the preset dynamic information represents the dynamic effect type preset for the target image. The server sends the dynamic-effect file to the wearable device. The wearable device displays a corresponding watch-face interface after detecting a second trigger operation, where the watch-face interface includes a dynamic-effect image that matches the dynamic effect type.

It can be learned that when the wearable device is not provided with a camera, the image generation request sent by the electronic device to the server may include the preset dynamic information and the target image. The server renders the target image based on the preset dynamic information, to obtain the dynamic-effect file corresponding to the target image. Then, the server sends the dynamic-effect file to the wearable device. The wearable device displays a corresponding watch-face interface after detecting a second trigger operation, where the watch-face interface includes a dynamic-effect image that matches the dynamic effect type. Therefore, in this application, a watch-face interface corresponding to the wearable device may be customized based on the preset dynamic information, and when the user uses the wearable device, a corresponding dynamic watch-face interface is displayed based on the second trigger operation of the user. This avoids a single style of the watch-face interface and enhances diversity and interest.

In a feasible implementation of the third aspect, the image generation request further includes the preset dynamic information. The electronic device may further send the target image and the preset dynamic information to the server. The server may render the target image based on the preset dynamic information sent by the electronic device, to subsequently obtain the dynamic-effect file corresponding to the target image.

In a feasible implementation of the third aspect, a process in which the wearable device displays a corresponding watch-face interface after detecting a second trigger operation includes:

The wearable device displays the corresponding watch-face interface based on a device status of the wearable device after detecting the second trigger operation.

After the wearable device detects the second trigger operation including a screen-on operation, if the wearable device is in a tilted state, the watch-face interface with tilt dynamic effect is displayed. The dynamic-effect image on the watch-face interface presents a tilt change in a horizontal direction and/or a vertical direction within a preset angle.

After the wearable device detects the second trigger operation including a screen-on operation, if the wearable device is in a rotation state, the watch-face interface with rotation dynamic effect is displayed. The dynamic-effect image on the watch-face interface presents a rotation change in a clockwise direction or an anti-clockwise direction.

After the wearable device detects the second trigger operation including a screen-on operation, if the wearable device is not in a tilted state or a rotation state, the watch-face interface with highlight dynamic effect is displayed. The dynamic-effect image on the watch-face interface presents a cyclic change from expansion to contraction and from contraction to expansion.

It can be learned that the wearable device may display watch-face interfaces with different dynamic effect based on the second trigger operation of the user and different states of the device. This improves diversity and interest of the watch-face interface, and the user can perform personalized watch-face customization.

In a feasible implementation of the third aspect, the dynamic-effect image includes a foreground area and a background area. A process in which the wearable device displays the watch-face interface with highlight dynamic effect includes: The wearable device displays the watch-face interface with highlight dynamic effect. The foreground area of the dynamic-effect image on the watch-face interface presents a cyclic change from expansion to contraction and from contraction to expansion.

It can be learned that the dynamic-effect image may include the foreground area and the background area. The foreground area includes a portrait area, and the background area includes another area other than the portrait area. In a process in which the wearable device displays the watch-face interface with highlight dynamic effect, the foreground area of the dynamic-effect image may present a cyclic change from expansion to contraction and from contraction to expansion, and the background area of the dynamic-effect image may not present a change, to highlight dynamic display effect of the portrait area. A dynamic-effect image with a more stereoscopic sense is presented to the user, thereby improving user experience.

In a feasible implementation of the third aspect, the first trigger operation includes an enabling operation of the user for a preset working mode of the wearable device, and the preset working mode is used by the wearable device to set a watch-face interface that corresponds to the wearable device and that includes the dynamic-effect image.

It can be learned that the preset working mode is used to set a dynamic watch-face interface that is of the wearable device and that includes the dynamic-effect image. After enabling the preset working mode, the user may set the dynamic watch-face interface including the dynamic-effect image. This improves richness of styles of the watch-face interface, and attracts the user to perform personalized watch-face customization.

According to a fourth aspect, an interaction system is provided. The interaction system includes an electronic device, a wearable device, and a server. The interaction system is configured to perform the display method for a watch-face interface according to any one of the first aspect or the display method for a watch-face interface according to any one of the third aspect.

According to a fifth aspect, an interaction system is provided. The interaction system includes a wearable device and a server. The interaction system is configured to perform the display method for a watch-face interface according to any one of the second aspect.

According to a sixth aspect, an electronic device is provided. The electronic device includes a memory and one or more processors. The memory is coupled to the processor. The memory stores computer program code, and the computer program code includes computer instructions. When the computer instructions are executed by the processor, the electronic device is enabled to perform the display method for a watch-face interface according to any one of the first aspect, or the display method for a watch-face interface according to any one of the second aspect, or the display method for a watch-face interface according to any one of the third aspect.

According to a seventh aspect, a computer-readable storage medium is provided. The computer-readable storage medium stores instructions. When the instructions are run on a computer, the computer is enabled to perform the display method for a watch-face interface according to any one of the first aspect, or the display method for a watch-face interface according to any one of the second aspect, or the display method for a watch-face interface according to any one of the third aspect.

DETAILED DESCRIPTION OF ILLUSTRATIVE EMBODIMENTS

Figure 1A:
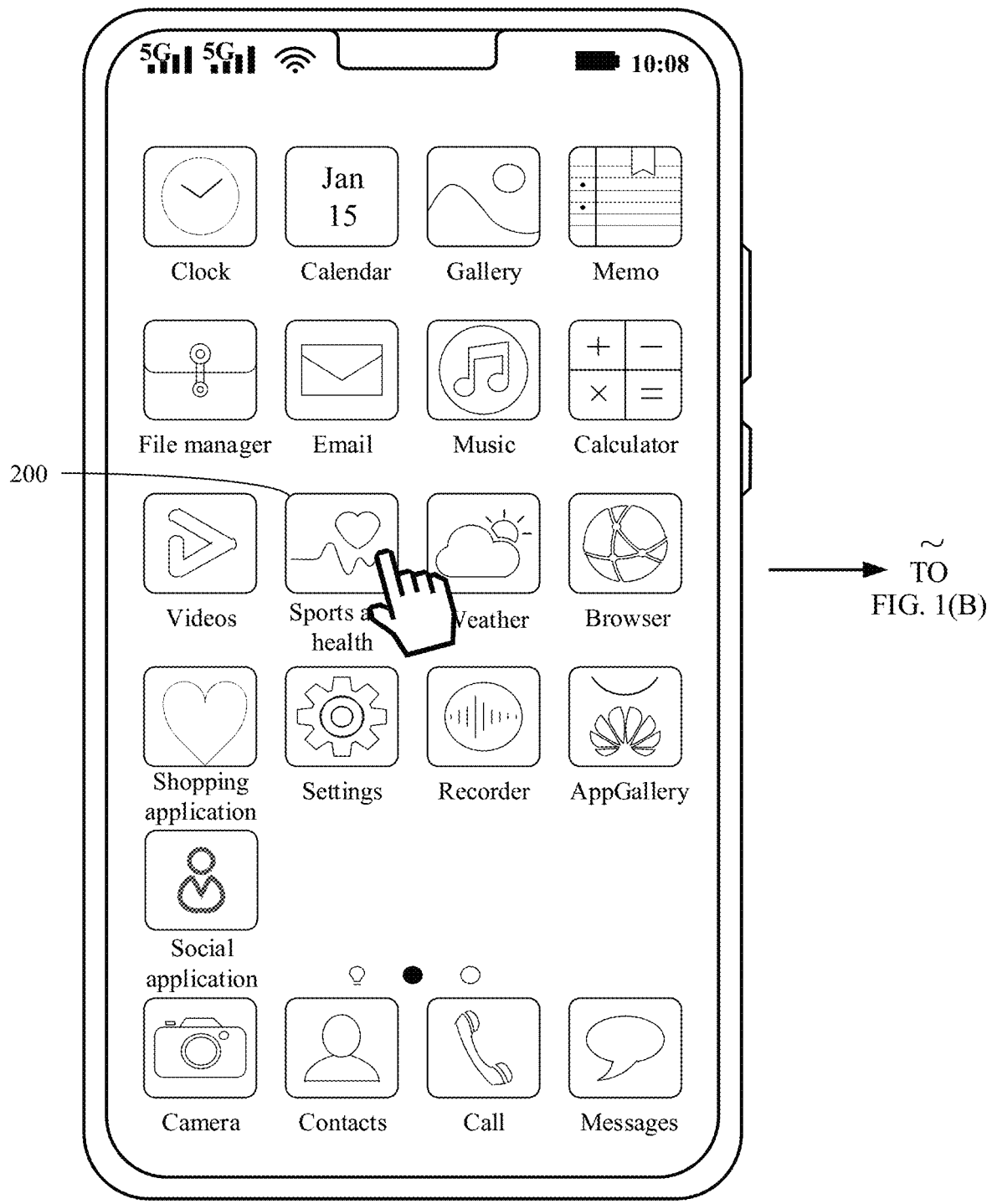
FIG. 1(A) to FIG. 1(D) are an interface diagram of a process of setting a watch-face interface according to an embodiment of this application.

The following describes the technical solutions in embodiments of this application with reference to accompanying drawings in embodiments of this application. In descriptions of this application, unless otherwise specified, "/" represents an "or" relationship between associated objects. For example, A/B may represent A or B. In this application, "and/or" describes only an association relationship between associated objects and represents that three relationships may exist. For example, A and/or B may indicate the following three cases: Only A exists, both A and B exist, and only B exists, where A and B may be singular or plural. In addition, in descriptions of this application, unless otherwise specified, "a plurality of" means two or more than two. "At least one of the following" or a similar expression thereof indicates any combination of these items, including any combination of single items or a plurality of items. For example, at least one of a, b, or c may represent a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items having basically same functions or purposes. A person skilled in the art may understand that the terms such as "first" and "second" do not limit a quantity or an execution sequence, and the terms such as "first" and "second" do not indicate a definite difference. In addition, in embodiments of this application, terms such as "example" or "for example" represent giving an example, an illustration, or a description. Any embodiment or design scheme described as an "example" or "for example" in embodiments of this application should not be explained as being more preferred or having more advantages than another embodiment or design scheme. Exactly, use of the terms such as "example" or "for example" is intended to present a related concept in a specific manner for ease of understanding.

In addition, network architectures and service scenarios described in embodiments of this application are intended to describe the technical solutions in embodiments of this application more clearly, and do not constitute a limitation on the technical solutions provided in embodiments of this application. A person of ordinary skill in the art may know that, with evolution of the network architectures and emergence of new service scenarios, the technical solutions provided in embodiments of this application are also applicable to similar technical problems.

With the rapid development of artificial intelligence technologies, people's pursuit of intelligence, function diversification, and humanization of life styles is becoming increasingly high. Wearable devices are widely used by people. Many users may wear the wearable devices every day, and wear the wearable devices for a long time. These wearable devices are small and convenient. The user may wear the wearable device to view or listen to a notification message, a reminder message, and the like, or may listen to music, listen to a book, and the like, or may further control some smart voice assistants, and the like.

In this embodiment of this application, the wearable device may include an electronic device having a display, such as a smartwatch, a smart bracelet, or a smart band. The following uses a smartwatch as an example. Usually, a watch face of the smartwatch is electronically displayed. The user may manually set a watch-face interface according to a use requirement of the user, to switch content displayed in the watch face. The watch-face interface set by the user may include a time watch-face interface, a date watch-face interface, a system background watch-face interface, and the like.

In addition, in a process of setting the watch-face interface, the user may further use a photo in an album application of the user as content displayed on the watch-face interface. In some embodiments, the user may establish a communication connection between the smartwatch and a mobile phone, and set a watch-face interface corresponding to the smartwatch by using an application program (application program, APP) in the mobile phone, for example, a sports and health app and a watch-face app. Certainly, the user may further directly set, in an app in the smartwatch, a watch-face interface corresponding to the watch face.

Figure 1B:
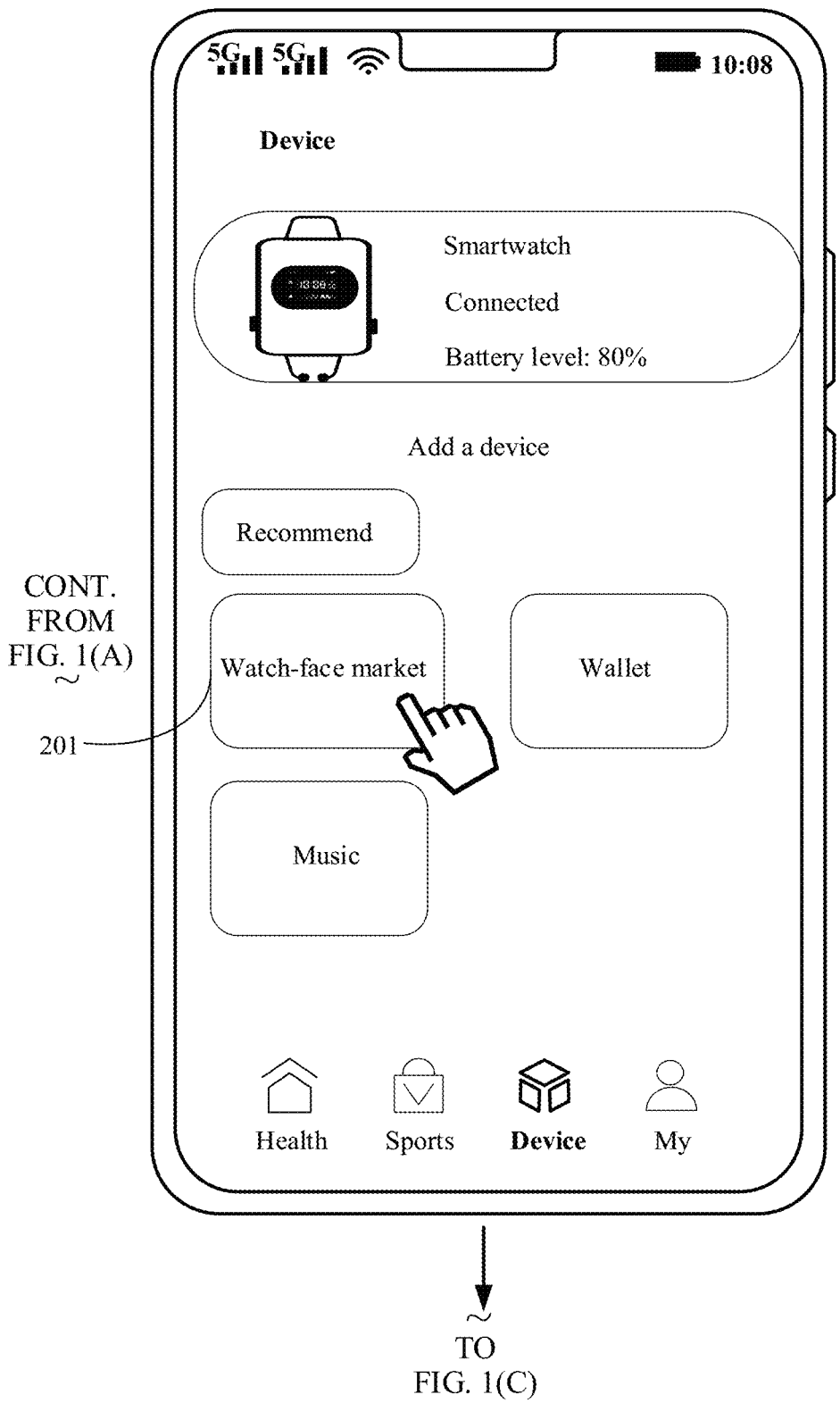
Figure 1C:
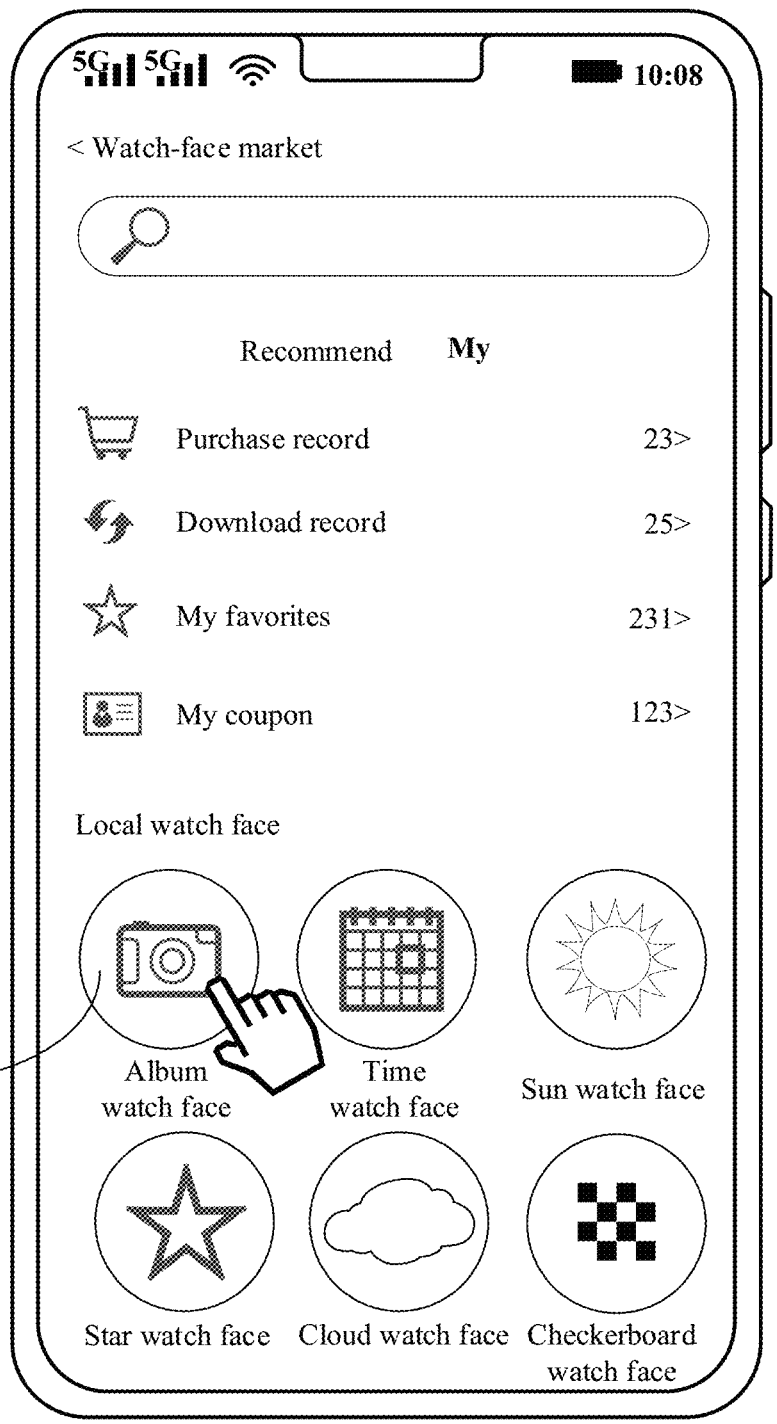
Figure 1D:
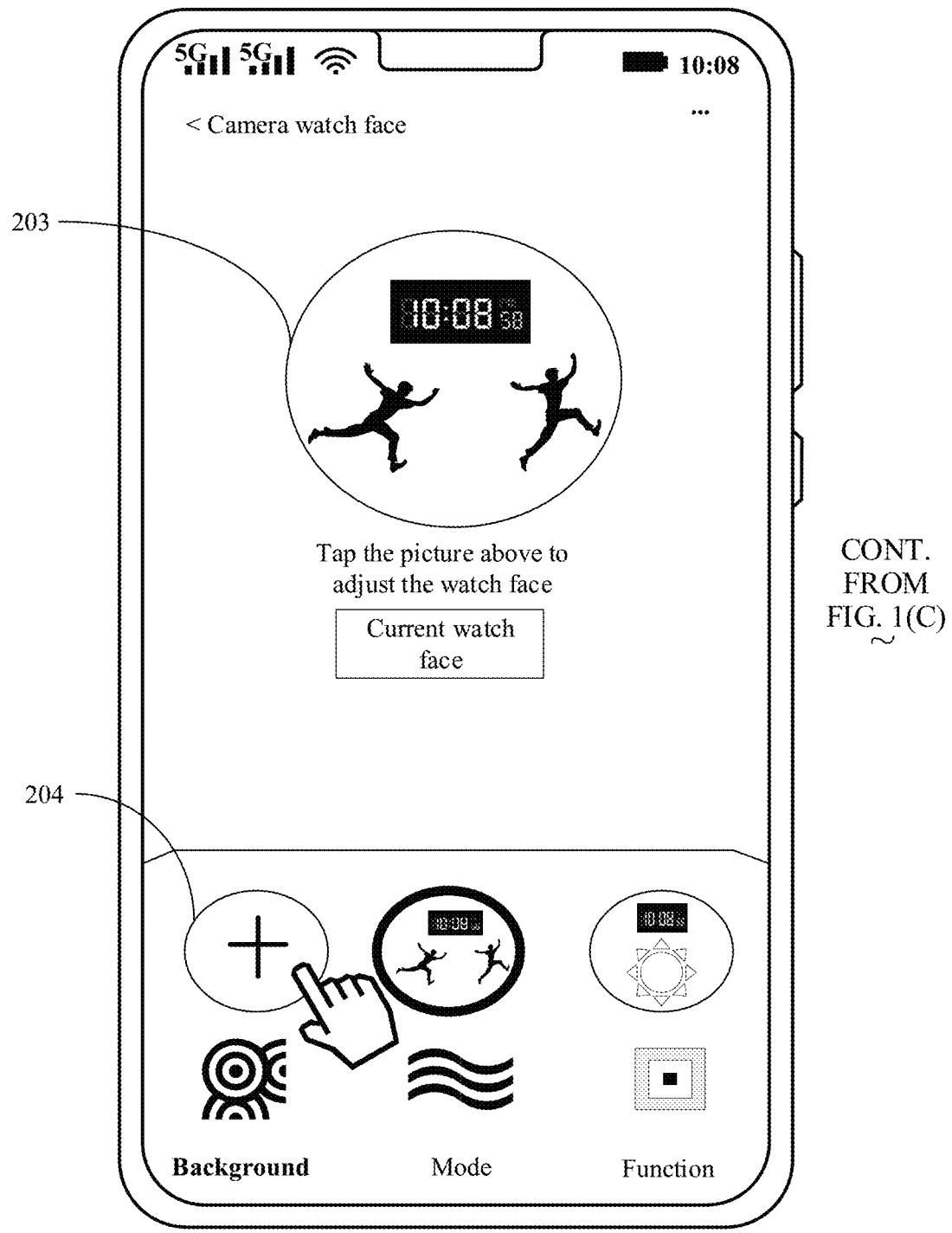

The following uses an example in which the user performs an operation on an app in the mobile phone. For example, FIG. 1(A) to FIG. 1(D) are an interface diagram of a process of setting a watch-face interface by a user. Refer to FIG. 1(A). A sports and health application icon 200 is displayed on a home screen interface of a mobile phone, and the user may tap the sports and health application icon 200. As shown in FIG. 1(B), the mobile phone displays a user interface of a sports and health application in response to a tap operation. The user interface may include device information, a control for adding a device, a function entry, and the like. For example, the device information includes a name, a connection status, remaining power, and the like that correspond to a smartwatch currently connected to the mobile phone. The control for adding a device is used to establish a communication connection between the mobile phone and another device after tapping of the user, to implement control of the mobile phone on the another device. The function entry may include a watch-face market function, a wallet function, a music function, and the like. The user may tap a watch-face market icon 201 corresponding to the watch-face market function, to trigger access to a watch-face market page corresponding to the watch-face market icon 201. As shown in FIG. 1(C), the mobile phone displays the watch-face market page in response to a tap operation, and the watch-face market page may include a camera watch-face control 202. Then, the user further needs to tap the camera watch-face control 202, to trigger access to a camera watch-face page. As shown in FIG. 1(D), the mobile phone displays the camera watch-face page in response to a tap operation. The camera watch-face page includes a display control 203, a replacement control 204, and the like. The display control 203 is used to display a current watch-face interface corresponding to the smartwatch. The replacement control 204 is used by the user to replace a watch face corresponding to the smartwatch according to a requirement of the user. Finally, the user may tap the replacement control 204, to replace the current watch-face interface of the smartwatch by using an album application.

Figure 2A:
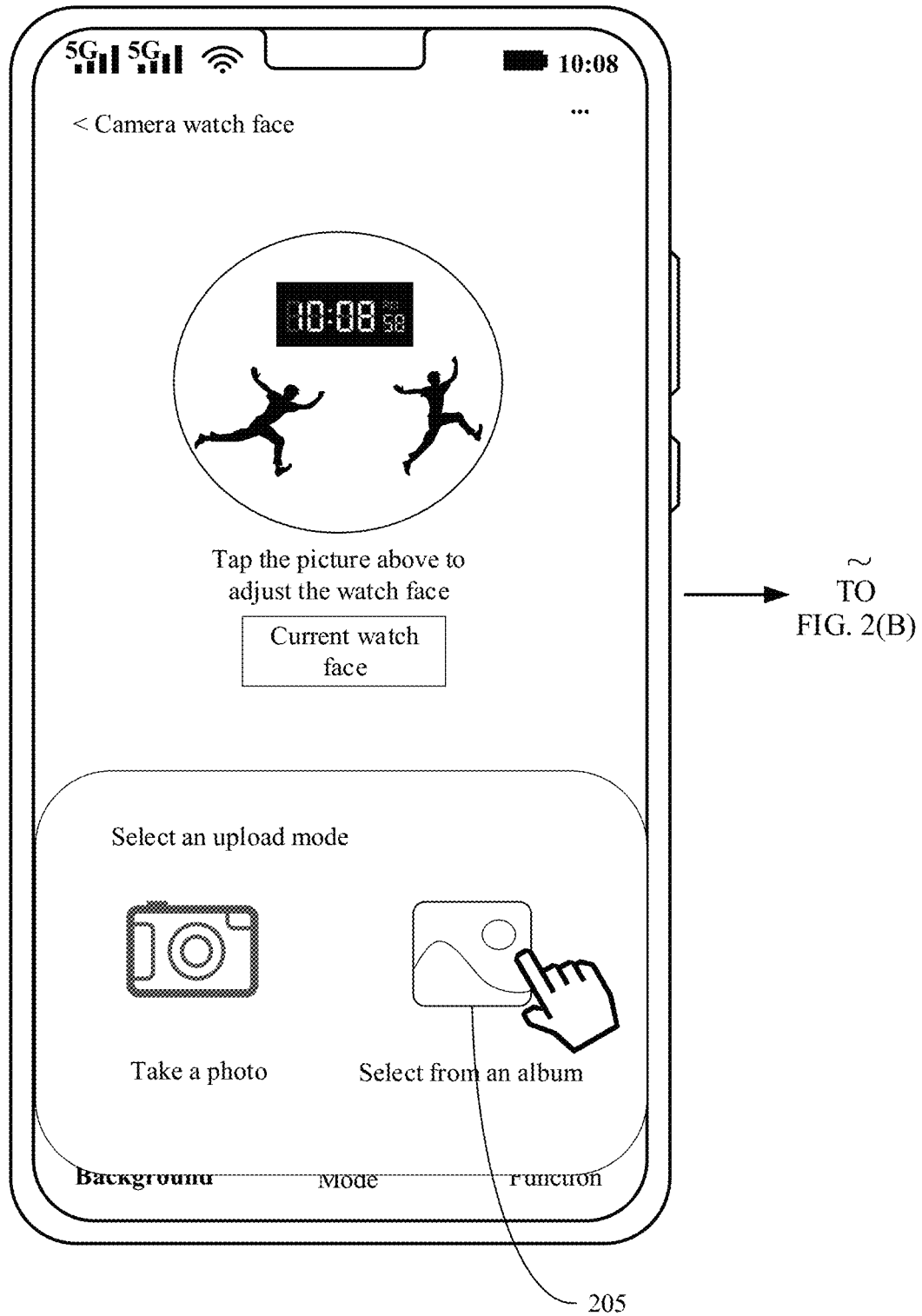
FIG. 2(A) to FIG. 2(C) are an interface diagram of another process of setting a watch-face interface according to an embodiment of this application.
Figure 2B:
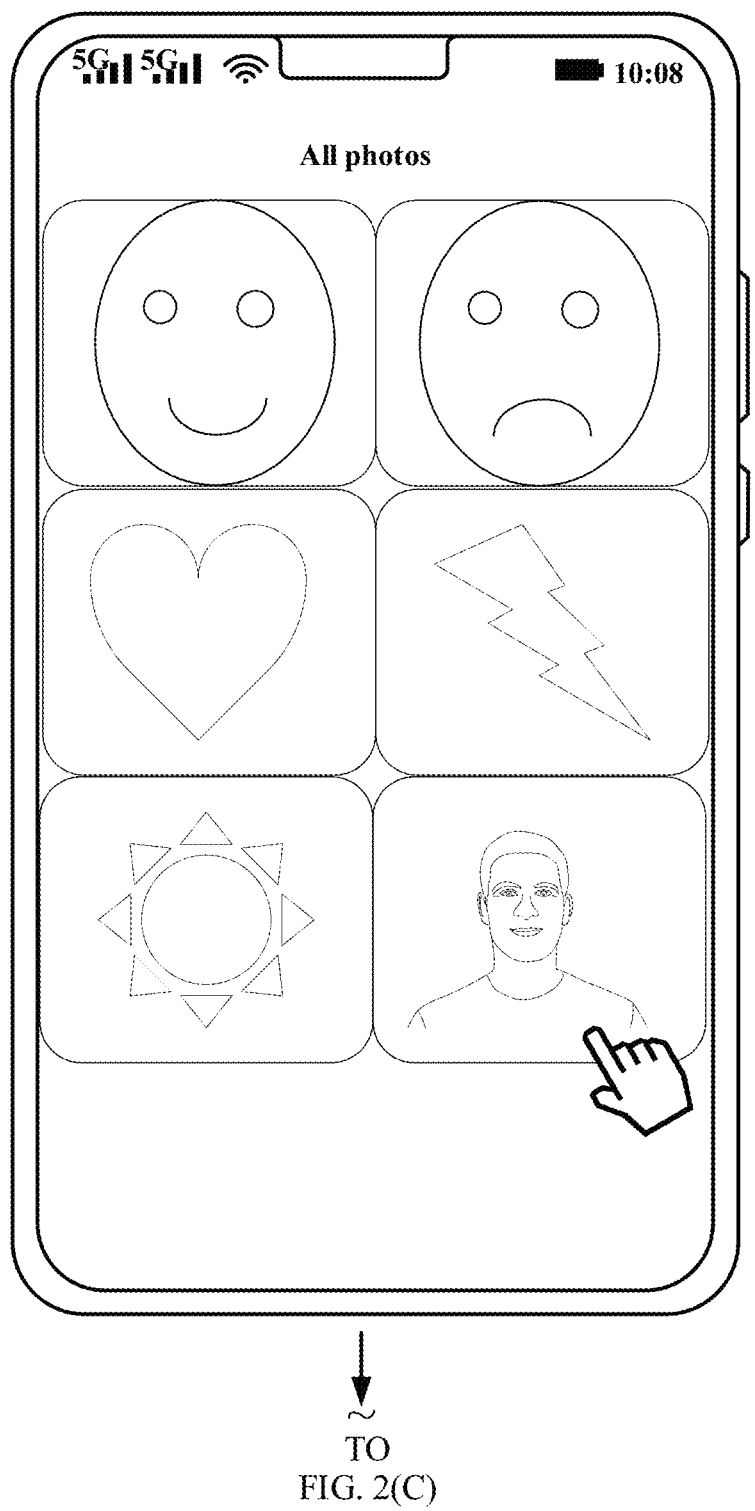
Figure 2C:
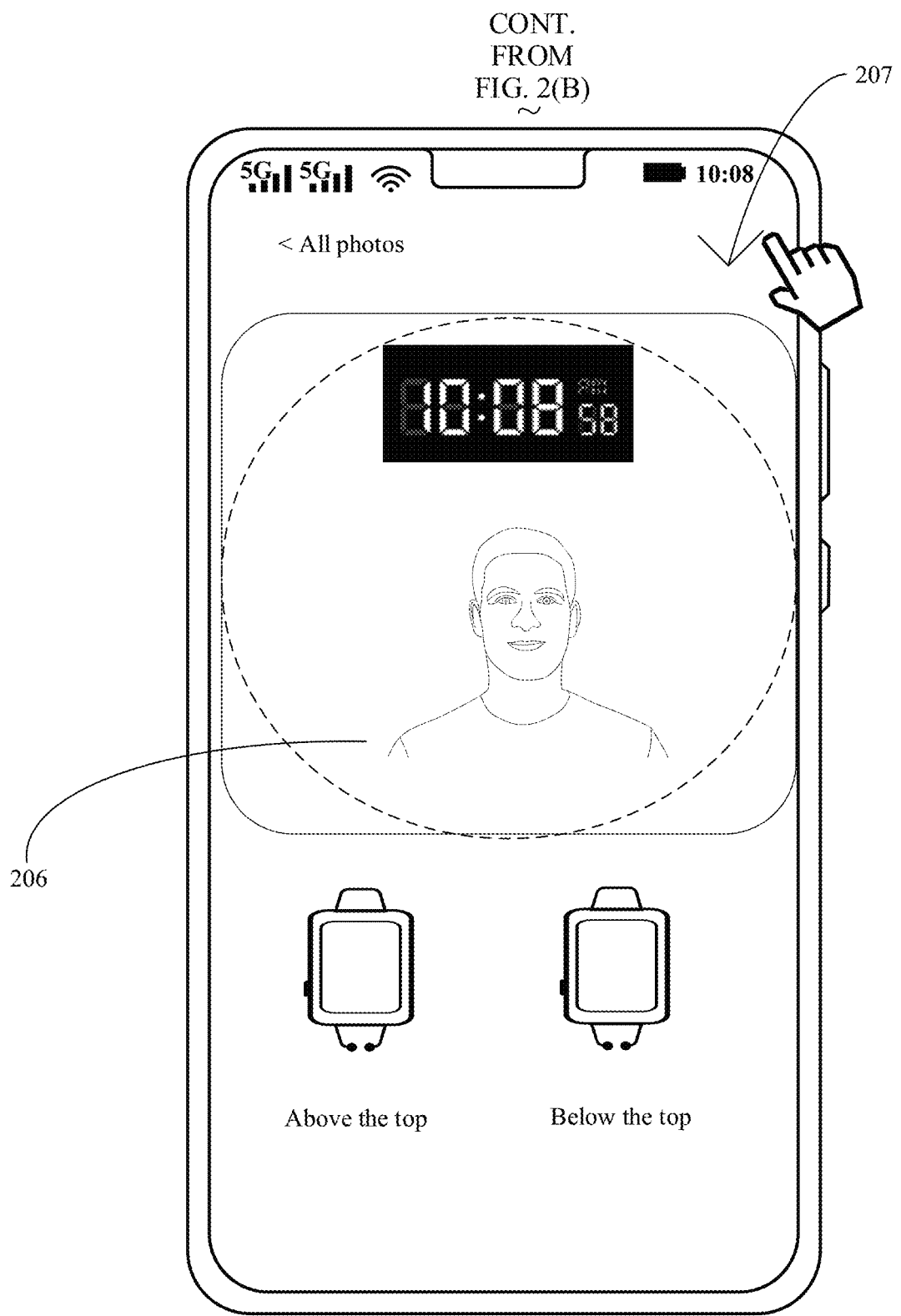

FIG. 2(A) to FIG. 2(C) are an interface diagram of another process of setting a watch-face interface by a user according to an embodiment of this application. As shown in FIG. 2(A), the mobile phone outputs a selection page in response to a tap operation of the user on the replacement control 204. The selection page is used to prompt the user to select a replacement manner of replacing the current watch face. The replacement manner includes using a photo taken by a photographing application for replacement and using a photo in the album application for replacement. The user may tap an album control 205 to trigger access to the album application. As shown in FIG. 2(B), the mobile phone displays an album application interface in response to a tap operation on the album control 205. A plurality of photos are displayed on the album application interface, and the user may tap any photo to replace the current watch-face interface corresponding to the smartwatch. As shown in FIG. 2(C), the mobile phone displays a preview watch-face interface in response to a tap operation. The preview watch-face interface includes a preview control 206 and a determining control 207. The preview control 206 is used to preview a watch face generated based on a photo selected by the user. The determining control 207 is used to set a watch-face interface previewed by the preview control 206 to a current watch-face interface of the smartwatch after tapping of the user. In this way, in a process of using the smartwatch by the user, the smartwatch presents a replaced watch-face interface, and content displayed on the watch-face interface includes the photo selected by the user.

It can be learned that the user may perform selection from different watch-face interfaces in a process of setting a watch-face interface. However, content displayed on each watch-face interface is limited to only a date, a time, a system background, or a static picture preset by the user. Styles of the watch-face interface are simple and lack diversity and interest, and the user cannot perform personalized watch-face customization, reducing user experience of using the smartwatch.

Based on the foregoing content, an embodiment of this application provides a display method for a watch-face interface, so that a watch-face interface corresponding to a smartwatch can be customized based on feature information corresponding to a user, and when the user uses the smartwatch, a corresponding watch-face interface is presented based on feature information of the user at a current moment. The user can customize a watch face to improve user experience.

Figure 3:
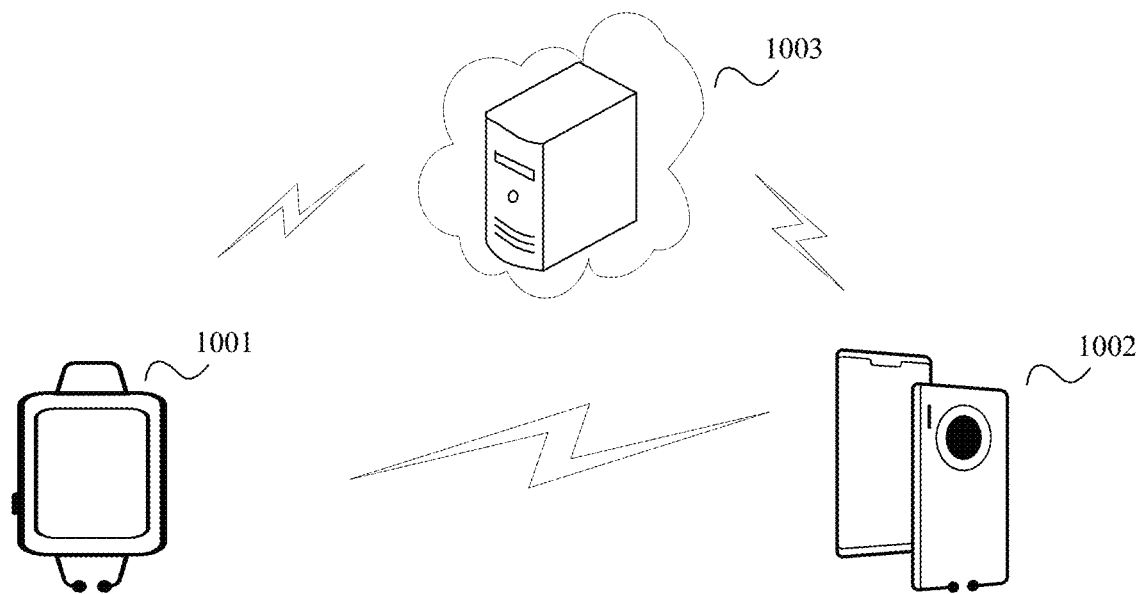
FIG. 3 is a diagram of a structure of an interaction system according to an embodiment of this application.

In some embodiments, the display method for a watch-face interface provided in this application may be applied to an interaction system. Refer to FIG. 3. The interaction system provided in embodiments of this application includes a first device (for example, a smartwatch 1001), a second device (for example, a mobile phone 1002), and a server 1003.

In some embodiments, communication connections are established between the first device, the second device, and the server. The communication connection may be a wireless communication connection. A wireless communication technology for establishing a wireless communication connection includes but is not limited to at least one of the following: a wireless local area network (wireless local area networks, WLAN) (such as a wireless fidelity (Wi-Fi) network), Bluetooth (BT) (such as conventional Bluetooth or Bluetooth low energy (BLE)), near-field communication (NFC), Zigbee, frequency modulation (FM), infrared (IR), and the like.

For example, the mobile phone 1002 may generate an image generation request based on a target image selected by the user and a first expression image, and send the image generation request to the server 1003. The server 1003 renders the target image based on initial expression information of the first expression image in response to the image generation request, to obtain a dynamic-effect image corresponding to the target image. Dynamic effect of the dynamic-effect image matches an expression type of the first expression image. Then, the server 1003 may store an association relationship between the smartwatch 1001 and the mobile phone 1002. The server 1003 may send the dynamic-effect image to the smartwatch 1001 associated with the mobile phone 1002. It may be understood that the server 1003 may also send the dynamic-effect image to the mobile phone 1002, and then the mobile phone 1002 sends the dynamic-effect image to the associated smartwatch 1001. After acquiring a second expression image, the smartwatch 1001 displays a corresponding watch-face interface based on an expression type of the second expression image. The watch-face interface includes the dynamic-effect image that matches the expression type of the second expression image.

In some embodiments, the server 1003 may further generate a dynamic-effect file corresponding to the target image in response to the image generation request. The dynamic-effect file includes a dynamic-effect image obtained by rendering the target image based on the initial expression information. Then, the server 1003 sends the dynamic-effect file to the smartwatch 1001 associated with the mobile phone 1002.

It should be noted that the first device may include a wearable device such as a smartwatch, a smart bracelet, a smart band, or a head-mounted device, or another electronic device with a display such as a mobile phone. An operating system installed on the first device includes but is not limited to iOS®, Android®, Harmony®, Windows®, Linux®, or another operating system. A specific type of the first device and an operating system installed on the first device are not limited in this application.

An operating system installed on the second device includes but is not limited to iOS®, Android®, Harmony®, Windows®, Linux®, or another operating system. Certainly, the first device may alternatively not be installed with an operating system. A specific type of the second device, whether an operating system is installed, and a type of an operating system when an operating system is installed are not limited in this application.

The second device may include an electronic device such as a mobile phone, a tablet computer, a smart home device, a notebook computer, a netbook, a personal digital assistant (PDA), a wearable device, and an artificial intelligence (AI) device. The smart home device includes, for example, a smart television, a smart curtain, and a smart screen.

Certainly, the interaction system provided in embodiments of this application may further include another electronic device in addition to the first device, the second device, and the server. Alternatively, the interaction system may include a first device and a second device. Alternatively, the interaction system may include a first device. The interaction system provided in embodiments of this application includes but is not limited to interaction between the first device, the second device, and the server, and may further include interaction between a plurality of other devices. A person skilled in the art may determine types and a quantity of electronic devices based on an actual requirement, and these designs do not go beyond the protection scope of embodiments of this application.

In some other embodiments, the interaction system provided in this application includes a first device and a server. The first device may include an electronic device including a camera and a display, for example, a wearable device, a smart home device, a mobile phone, a tablet computer, a notebook computer, a netbook, a PDA, or an AI device. The smart home device includes, for example, a smart television, a smart curtain, and a smart screen. The wearable device may include an electronic device having a display, such as a smartwatch, a smart bracelet, or a smart band. A specific type of the first device is not limited in embodiments of this application. The first device sends an image generation request to the server in response to a first trigger operation of the user. The image generation request includes a target image selected by the user and a first expression image. The server renders the target image based on initial expression information of the first expression image in response to the image generation request, to obtain a dynamic-effect image corresponding to the target image. Dynamic effect of the dynamic-effect image matches an expression type of the first expression image. Then, the server sends the dynamic-effect image to the first device. The first device displays a corresponding watch-face interface based on an acquired second expression image after detecting a second trigger operation of the user. The watch-face interface includes the dynamic-effect image that matches an expression type of the second expression image.

In some other embodiments, the interaction system provided in this application includes a first device. The first device may include an electronic device including a camera and a display, for example, a wearable device, a smart home device, a mobile phone, a tablet computer, a notebook computer, a netbook, a PDA, or an AI device. The first device may render, based on initial expression information corresponding to the user, a target image selected by the user, to generate a dynamic-effect image corresponding to the target image. Then, the first device displays a corresponding watch-face interface in response to a trigger operation of the user. The watch-face interface includes the dynamic-effect image.

The following uses an example in which the first device is the smartwatch 100 in the wearable device for description.

Figure 4:
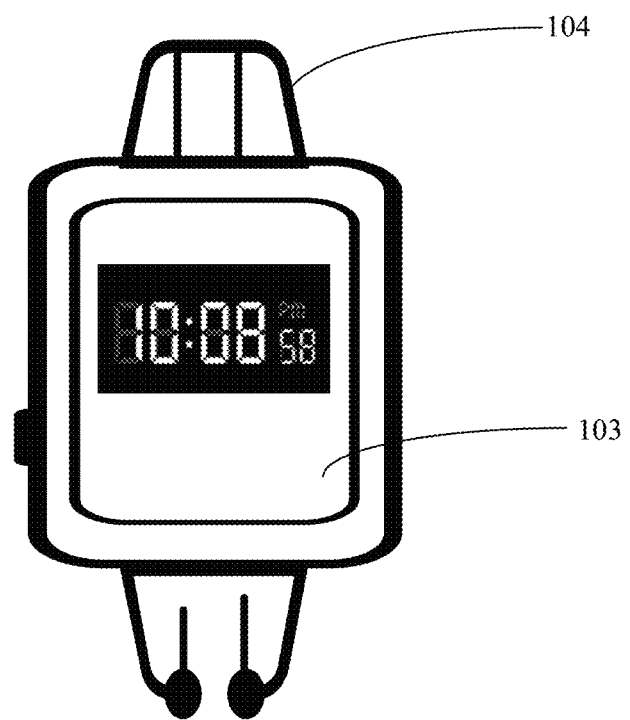
FIG. 4 is a diagram of a structure of a smartwatch according to an embodiment of this application.

For example, FIG. 4 is a diagram of a structure of a smartwatch 100. The smartwatch 100 may be worn on a user's wrist. The smartwatch 100 may include a display 103 and a fixed band 104. The display 103 is configured to display time and the user touches to display other related content. The fixed band 104 is configured to fasten the smartwatch 100 to the user's wrist.

Figure 5:
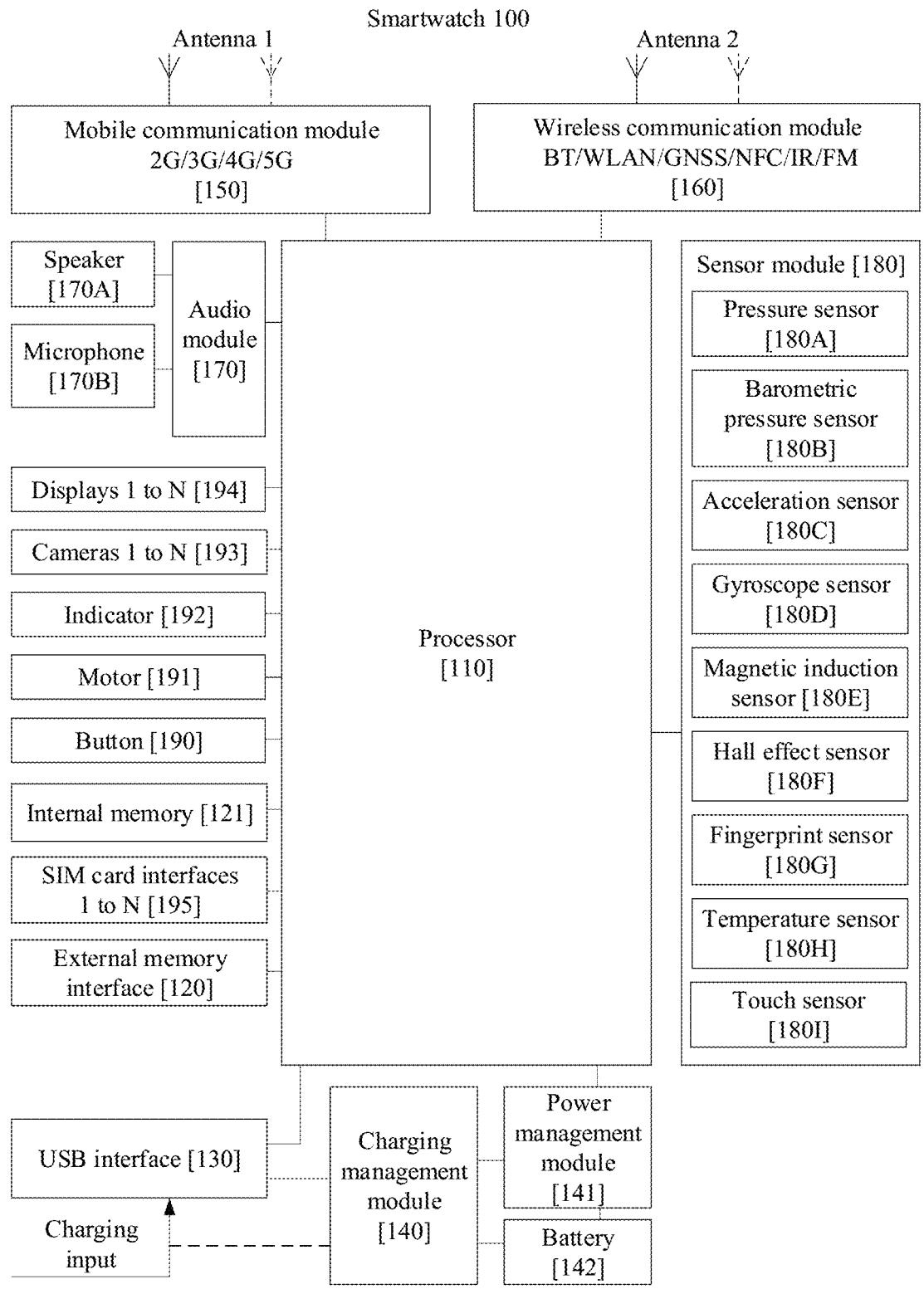
FIG. 5 is a diagram of a hardware structure of a smartwatch according to an embodiment of this application.

For example, FIG. 5 is a diagram of a hardware structure of a smartwatch 100 according to an embodiment of this application. Refer to FIG. 5. The smartwatch 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a microphone 170B, a sensor module 180, a button 190, a motor 191, an indicator 192, a camera 193, a display 194, a subscriber identity module (SIM) card interface 195, a positioning module 196, and the like. The sensor module 180 may include a pressure sensor 180A, a barometric pressure sensor 180B, an acceleration sensor 180C, a gyroscope sensor 180D, a magnetic induction sensor 180E, a Hall effect sensor 180F, a fingerprint sensor 180G, a temperature sensor 180H, a touch sensor 180I, and the like.

It may be understood that the structure shown in this embodiment of the present invention does not constitute a specific limitation on the smartwatch 100. In some other embodiments of this application, the smartwatch 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the smartwatch 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through the smartwatch 100.

The PCM interface may also be configured to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through the smartwatch 100. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through the smartwatch 100.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the smartwatch 100. The processor 110 communicates with the display 194 through the DSI interface, to implement a display function of the smartwatch 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, and the like.

The USB interface 130 is an interface that conforms to a USB standard specification, and may be specifically a mini USB interface, a micro USB interface, a USB type-C interface, and the like. The USB interface 130 may be configured to connect to a charger to charge the smartwatch 100, or may be configured to perform data transmission between the smartwatch 100 and a peripheral device, or may be configured to connect to a headset for playing audio through the headset. The interface may be further configured to connect to another electronic device such as an AR device.

It may be understood that an interface connection relationship between the modules shown in this embodiment of this application is merely an example for description, and does not constitute a limitation on the structure of the smartwatch 100. In some other embodiments of this application, the smartwatch 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the smartwatch 100. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a quantity of battery cycles, and a battery state of health (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the smartwatch 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the smartwatch 100 may be configured to cover a single or a plurality of communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution that is applied to the smartwatch 100 and that includes 2G/3G/4G/5G or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to a speaker 170A and the like), or displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the smartwatch 100 and that includes a wireless local area network (WLAN) (for example, a wireless fidelity (Wi-Fi) network), Bluetooth (Bluetooth, BT), a global navigation satellite system (GNSS), frequency modulation (FM), near field communication (NFC), an infrared (IR) technology, and the like. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the smartwatch 100 are coupled, and the antenna 2 and the wireless communication module 160 are coupled, so that the smartwatch 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The smartwatch 100 implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the smartwatch 100 may include one or N displays 194, where N is a positive integer greater than 1.

The smartwatch 100 can implement a photographing function by using the ISP, the camera 193, the video codec, the GPU, the display 194, the application processor, and the like.

The ISP may be configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the smartwatch 100 may include one or N cameras 193, where N is a positive integer greater than 1.

The digital signal processor is configured to process a digital signal, and may process another digital signal in addition to the digital image signal. For example, when the smartwatch 100 selects a frequency, the digital signal processor is configured to perform Fourier transform on energy of the frequency.

The video codec is configured to compress or decompress a digital video. The smartwatch 100 may support one or more video codecs. Therefore, the smartwatch 100 may play or record videos in a plurality of coding formats, for example, moving picture experts group (MPEG)-1, MPEG-2, MPEG-3, and MPEG-4.

The external memory interface 120 may be configured to connect to an external storage card, for example, a micro SD card, to extend a storage capability of the smartwatch 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) and the like created during use of the smartwatch 100. In addition, the internal memory 121 may include a high-speed random access memory, and may further include a non-volatile memory, for example, at least one magnetic disk storage device, a flash memory device, or universal flash storage (universal flash storage, UFS). The processor 110 runs the instructions stored in the internal memory 121 and/or instructions stored in the memory disposed in the processor, to perform various function applications and data processing of the smartwatch 100.

The smartwatch 100 may implement an audio function, for example, music playing and recording, by using the audio module 170, the speaker 170A, the microphone 170B, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The smartwatch 100 may listen to music or answer a call in a hands-free mode over the speaker 170A.

The microphone 170B, also referred to as a "mic" or a "mike", is configured to convert a sound signal into an electrical signal. When making a call or sending a voice message, a user may move the mouth of the user close to the microphone 170B to make a sound, to input a sound signal to the microphone 170B. At least one microphone 170B may be disposed in the smartwatch 100. In some other embodiments, two microphones 170B may be disposed in the smartwatch 100, to implement a noise reduction function in addition to collecting a sound signal. In some other embodiments, three, four, or more microphones 170B may alternatively be disposed in the smartwatch 100, to collect a sound signal, implement noise reduction, and identify a sound source, to implement a directional recording function and the like.

The pressure sensor 180A is configured to sense a pressure signal, and can convert the pressure signal into an electrical signal. In some embodiments, the pressure sensor 180A may be disposed in the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, a capacitance between electrodes changes. The smartwatch 100 determines a pressure strength based on a change of the capacitance. When a touch operation is performed on the display 194, the smartwatch 100 detects a strength of the touch operation by using the pressure sensor 180A. The smartwatch 100 may also calculate a touch location based on a detection signal of the pressure sensor 180A.

The barometric pressure sensor 180B is configured to measure barometric pressure. In some embodiments, the smartwatch 100 calculates an altitude based on a barometric pressure value measured by the barometric pressure sensor 180B, to assist in positioning and navigation.

The acceleration sensor 180C may detect magnitudes of acceleration of the smartwatch 100 in various directions (usually on three axes). When the smartwatch 100 is in a static state, a magnitude and a direction of gravity may be detected.

The gyroscope sensor 180D may be configured to determine a motion posture of the smartwatch 100. In some embodiments, angular velocities of the smartwatch 100 around three axes (namely, axes x, y, and z) may be determined by using the gyroscope sensor 180D.

The magnetic induction sensor 180E, also referred to as an electronic compass, is configured to position a device. In some examples, the smartwatch 100 may calculate a posture of the smartwatch 100 based on the acceleration sensor 180C, the gyroscope sensor 180D, and the magnetic induction sensor 180E, and apply the posture to a pedometer application.

The Hall effect sensor 180F is configured to detect whether the front or the back of a watch body of the smartwatch 100 is upward, so that the processor 110 determines whether the smartwatch 100 enters a do-not-disturb mode/a power saving mode/a predefined mode or the like. The Hall effect sensor 180F is further configured to detect whether the watch body of the smartwatch 100 is separated from the housing, so that the processor 110 determines whether to automatically answer a call, and the like.

The fingerprint sensor 180G is configured to collect a fingerprint. The smartwatch 100 may use a feature of the collected fingerprint to implement fingerprint-based unlocking, application lock access, fingerprint-based photographing, fingerprint-based call answering, and the like.

The temperature sensor 180H is configured to detect a temperature. In some embodiments, the smartwatch 100 executes a temperature processing policy by using the temperature detected by the temperature sensor 18F. For example, when the temperature reported by the temperature sensor 180J exceeds a threshold, the smartwatch 100 reduces performance of a processor near the temperature sensor 180H, to reduce power consumption and implement heat protection. In some other embodiments, when the temperature is lower than another threshold, the smartwatch 100 heats the battery 142, to avoid an abnormal shutdown of the smartwatch 100 caused by a low temperature. In some other embodiments, when the temperature is lower than still another threshold, the smartwatch 100 boosts an output voltage of the battery 142, to avoid an abnormal shutdown caused by a low temperature.

The touch sensor 180I is also referred to as a "touch component". The touch sensor 180I may be disposed in the display 194, and the touch sensor 180I and the display 194 form a touchscreen, which is also referred to as a "touch screen". The touch sensor 180I is configured to detect a touch operation performed on or near the touch sensor 180I. The touch sensor may transfer the detected touch operation to the application processor to determine a type of a touch event. A visual output related to the touch operation may be provided through the display 194. In some other embodiments, the touch sensor 180I may alternatively be disposed on a surface of the smartwatch 100 at a location different from that of the display 194.

Optionally, the sensor module 180 may further include a distance sensor, an optical proximity sensor, an ambient light sensor, a bone conduction sensor, and the like.

The button 190 includes a power button, a volume button, and the like. The button 190 may be a mechanical button, or may be a touch button. The smartwatch 100 may receive a button input, and generate a button signal input related to user setting and function control of the smartwatch 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effect. The motor 191 may also correspond to different vibration feedback effect for touch operations performed on different areas of the display 194. Different application scenarios (for example, a time reminder, information receiving, an alarm clock, and a game) may also correspond to different vibration feedback effect. Touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or pulled out of the SIM card interface 195, to implement contact with or separation from the smartwatch 100. The smartwatch 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. Types of the plurality of cards may be the same or may be different. The SIM card interface 195 may be compatible with different types of SIM cards. The SIM card interface 195 may also be compatible with an external memory card. The smartwatch 100 interacts with a network by using the SIM card, to implement functions such as calling and data communication. In some embodiments, the smartwatch 100 uses an eSIM, namely, an embedded SIM card. The eSIM card may be embedded in the smartwatch 100, and cannot be separated from the smartwatch 100.

The positioning module 196 may be configured to position the smartwatch 100. For example, the positioning module 196 may be a GPS module, a BeiDou module, or the like. This application does not specifically limit the positioning module 196. In some embodiments, the positioning module 196 is configured to determine a strength of a positioning signal. The strength of the positioning signal may be used to indicate a scene in which the smartwatch 100 is located. For example, the smartwatch 100 is indoors without natural light, or indoors near a window, or outdoors, or outdoors with light blocked.

A software system of the smartwatch 100 may use a layered architecture, an event-driven architecture, a microkernel architecture, a micro service architecture, or a cloud architecture. In this embodiment of the present invention, an Android system with a layered architecture is used as an example to describe the software structure of the smartwatch 100.

Figure 6:
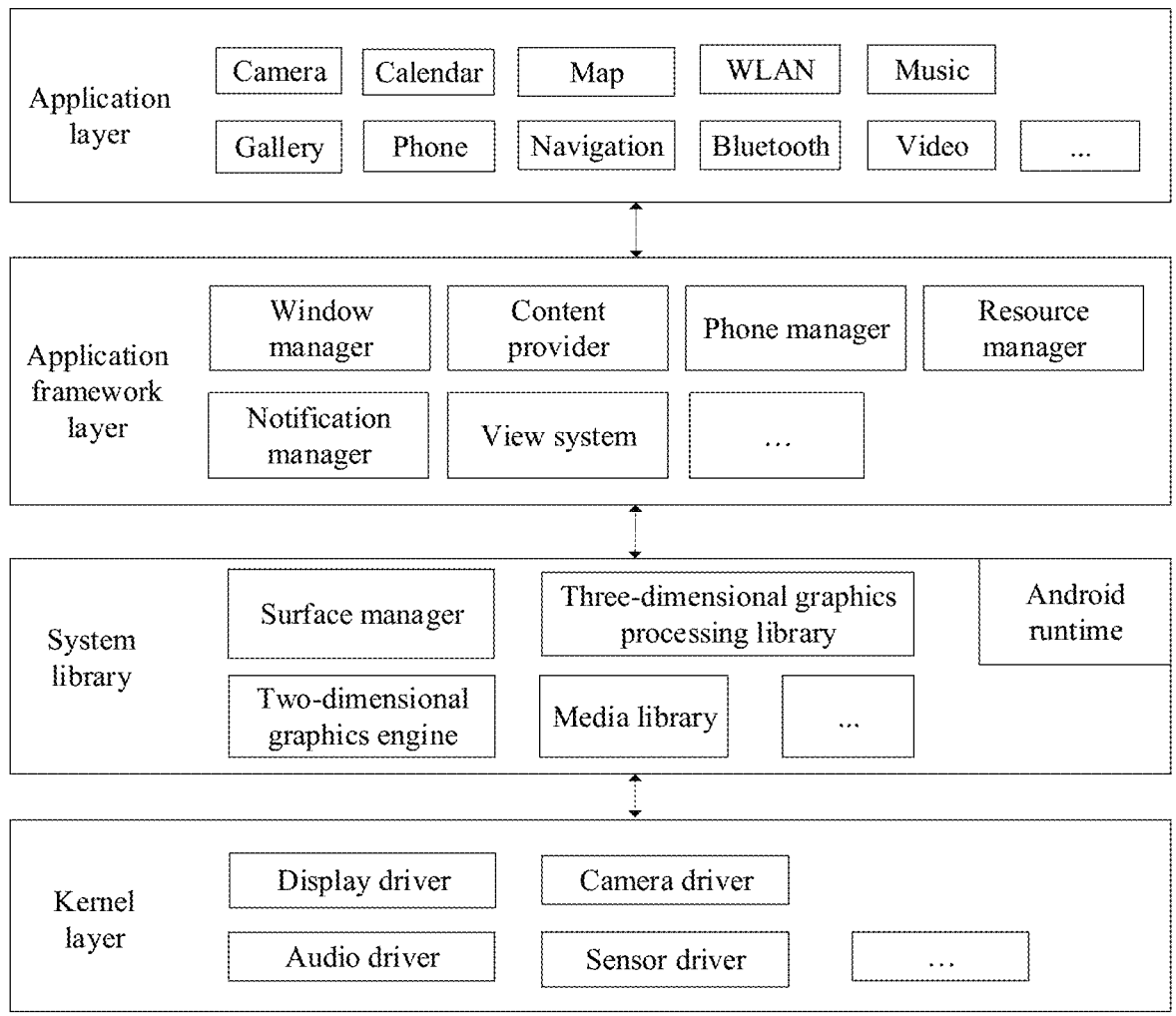
FIG. 6 is a diagram of a software structure of a smartwatch according to an embodiment of this application.

FIG. 6 is a block diagram of a software structure of a smartwatch 100 according to an embodiment of the present invention.

The layered architecture divides software into several layers, and each layer has a clear role and responsibility. The layers communicate with each other through a software interface. In some embodiments, an Android system is divided into four layers: an application layer, an application framework layer, Android runtime (Android runtime) and a system library, and a kernel layer.

The application layer may include a series of application packages.

As shown in FIG. 6, the application packages may include applications such as Camera, Gallery, Calendar, Call, Map, Navigation, WLAN, Bluetooth, Weather, and Videos.

The application framework layer provides an application programming interface (API) and a programming framework for an application in the application layer. The application framework layer includes some predefined functions.

As shown in FIG. 6, the application framework layer may include a window manager, a content provider, a view system, a phone manager, a resource manager, a notification manager, a location manager, and the like.

The window manager is used to manage a window program. The window manager may obtain a size of the display, determine whether there is a status bar, perform screen locking, take a screenshot, and the like.

The content provider is used to store and obtain data, and enable the data to be accessed by an application. The data may include a video, an image, audio, calls that are made and received, a browsing history, a bookmark, a phone book, and the like.

The view system includes visual controls, such as a control for displaying text and a control for displaying a picture. The view system may be used to construct an application. A display interface may include one or more views. For example, a display interface including a message notification icon may include a view for displaying text and a view for displaying a picture.

The phone manager is used to provide a communication function of the smartwatch 100, for example, management of a call status (including answering, declining, or the like).

The resource manager provides an application with various resources, such as a localized character string, an icon, a picture, a layout file, and a video file.

The notification manager enables an application to display notification information in a status bar, and may be used to convey a notification-type message. The displayed notification information may automatically disappear after a short pause without user interaction. For example, the notification manager is used to notify download completion, provide a message notification, and the like. The notification manager may alternatively be a notification that appears in a top status bar of the system in a form of a graph or scroll bar text, for example, a notification of an application that is run in the background, or may be a notification that appears on the screen in a form of a dialog window. For example, text information is displayed in the status bar, an announcement is given, the electronic device vibrates, or the indicator light blinks.

The location manager is used to provide a location service for the smartwatch 100. A system service of the location manager is a core component of a location service, and provides a series of methods to handle location-related issues, including querying a previous known location, registering and deregistering periodic location updates from a component that provides a location function (location provider), and registering and deregistering a trigger for a defined intent (intent) when approaching coordinates.

The Android runtime includes a kernel library and a virtual machine. The Android runtime is responsible for scheduling and management of the Android system.

The kernel library includes two parts: a function that needs to be invoked in a Java language and a kernel library of Android.

The application layer and the application framework layer run on the virtual machine. The virtual machine executes Java files at the application layer and the application framework layer as binary files. The virtual machine is used to perform functions such as object lifecycle management, stack management, thread management, security and exception management, and garbage collection.

The system library may include a plurality of functional modules, for example, a surface manager, a media library (Media Libraries), a three-dimensional graphics processing library (for example, an OpenGL ES), and a 2D graphics engine (for example, an SGL).

The surface manager is used to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG-4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 7:
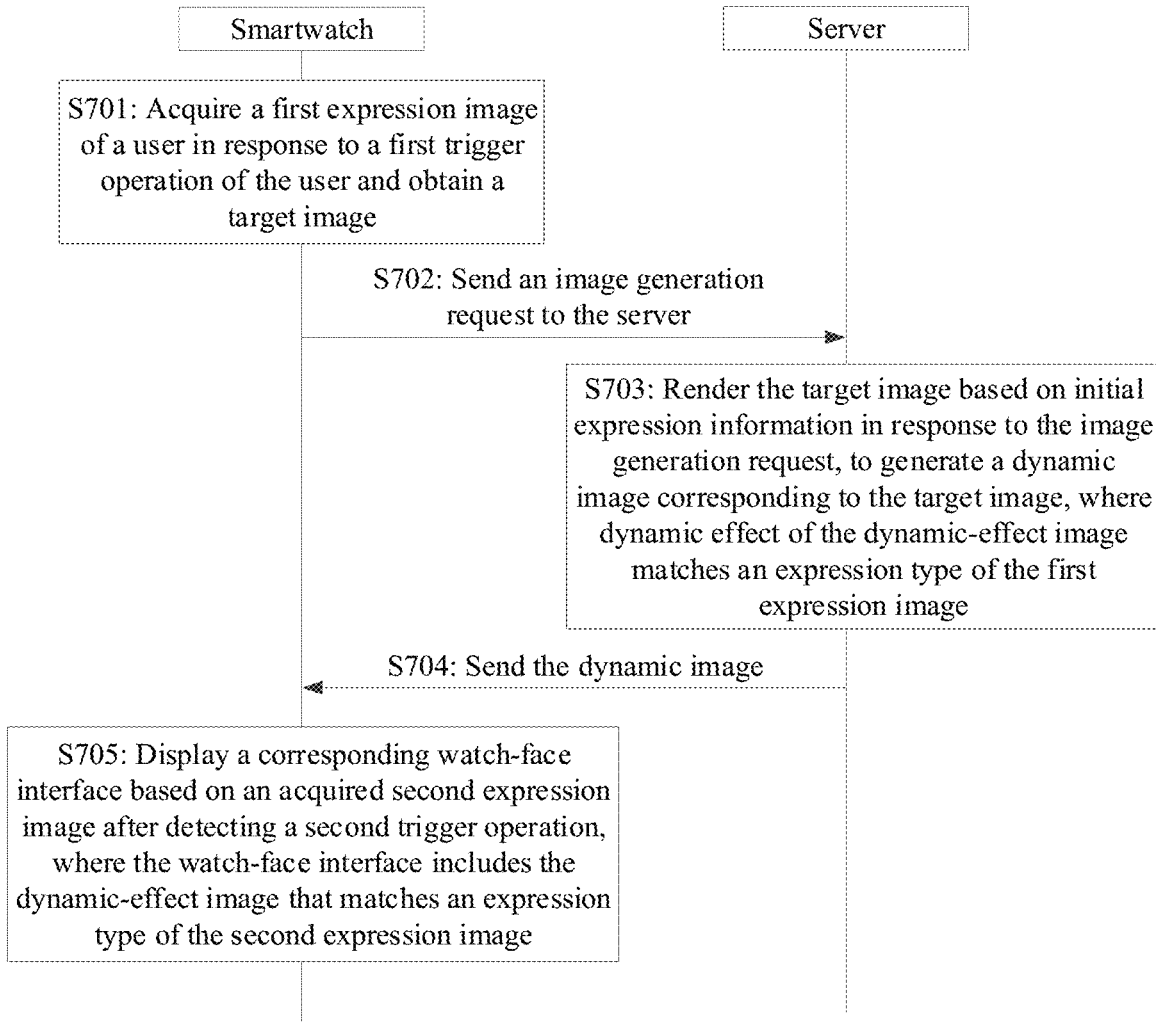
FIG. 7 is an interaction diagram of a display method for a watch-face interface according to an embodiment of this application.

With reference to the interaction system shown in FIG. 3, the following describes the display method for a watch-face interface provided in embodiments of this application by using an example in which the interaction system includes a first device and a server, and the first device is a smartwatch. FIG. 7 is an interaction diagram of a display method for a watch-face interface according to an embodiment of this application. As shown in FIG. 7, the method may include the following steps S701 to S705.

Step S701: The smartwatch acquires a first expression image of a user in response to a first trigger operation of the user and obtains a target image, where the first expression image is an image that corresponds to a current user and that is acquired by the smartwatch, and the target image is a static image selected by the user.

Figure 8A:
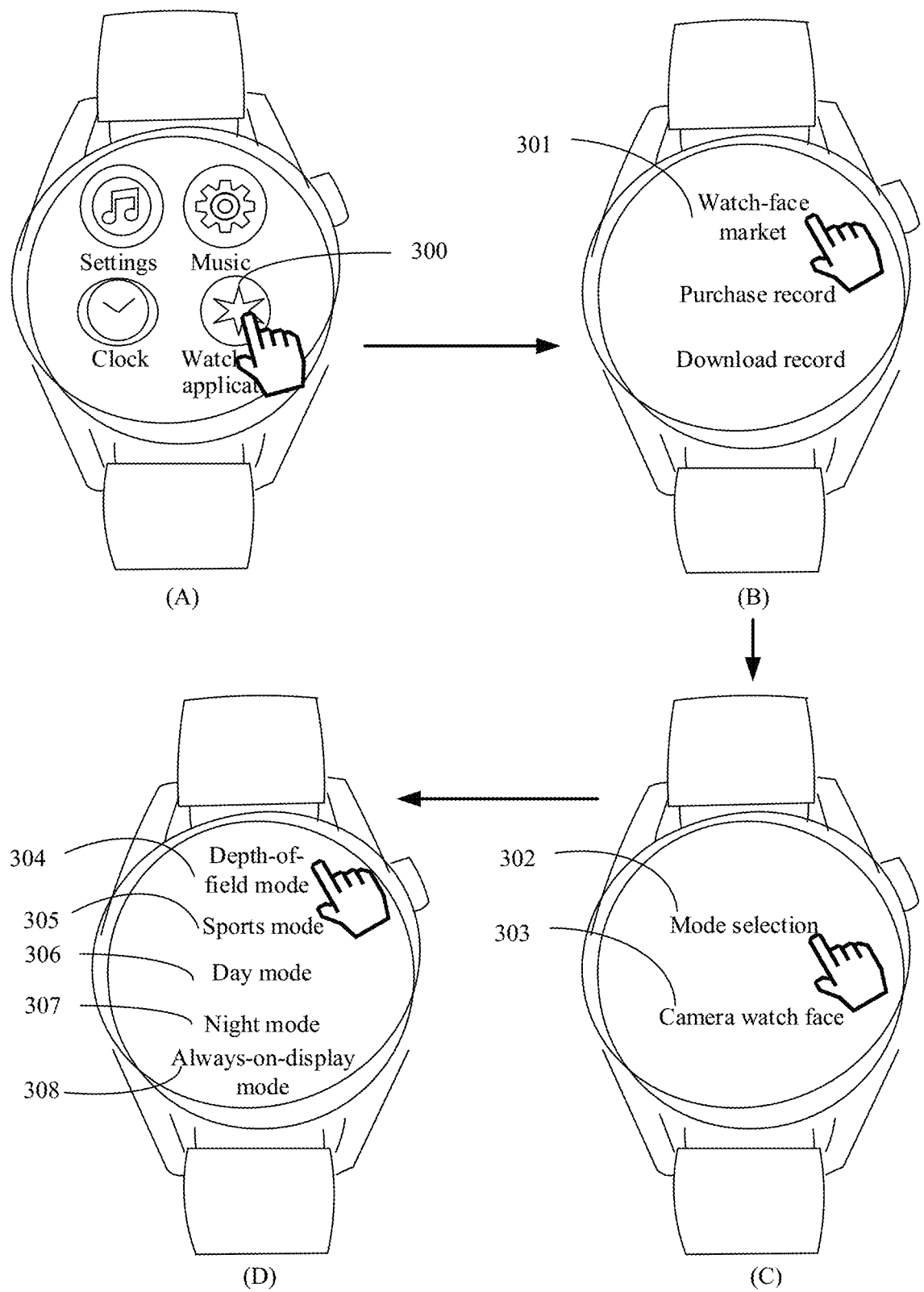
FIG. 8A is an interface diagram of another process of setting a watch-face interface according to an embodiment of this application.

In an actual scenario, when the user wants to interact with the watch, the user usually wears the smartwatch, lifts a wrist, and looks down at the watch. Then, the user may enable a preset working mode of the smartwatch. The preset working mode is used to set a watch-face interface that includes a dynamic-effect image and that corresponds to the smartwatch. For example, the preset working mode may be a depth-of-field mode. For example, FIG. 8A is an interface diagram of a process of setting a watch-face interface by a user. Refer to (A) in FIG. 8A. A watch-face application icon 300 is displayed on a home screen interface of the smartwatch, and the user may tap the watch-face application icon 300. As shown in (B) in FIG. 8A, the smartwatch displays a user interface of the watch-face application in response to a tap operation. The user interface may include function entries such as a watch-face market entry, a purchase record, and a download record. The user may tap a watch-face market icon 301 corresponding to a watch-face market function, to trigger access to a watch-face market page corresponding to the watch-face market icon 301. As shown in (C) in FIG. 8A, a mobile phone displays the watch-face market page in response to a tap operation. The watch-face market page may include a mode selection control 302 and a camera watch-face control 303. Then, the user needs to tap the mode selection control 302 to trigger access to a mode selection page. As shown in (D) in FIG. 8A, the smartwatch displays the mode selection page in response to a tap operation. The mode selection page includes a plurality of watch-face modes, for example, a depth-of-field mode control 304, a sports mode control 305, a day mode control 306, a night mode control 307, and an always-on-display mode 308. The user may tap the depth-of-field mode 304 to select and enable the depth-of-field mode of the smartwatch.

It should be noted that the foregoing interfaces in the process of setting the watch-face interface by the user are merely examples. A watch-face market function entry, a display and brightness function entry, and the like may be further set in a settings application in the smartwatch. The user may set the watch-face interface in another manner. This is not specifically limited in this embodiment of this application.

In some embodiments, each watch-face mode corresponds to a watch-face function, and different watch-face modes correspond to different watch-face interfaces. For example, in the sports mode, the smartwatch may control a display to display a sports watch-face interface corresponding to the sports mode. The sports mode is used to display, on the watch-face interface, fitness data corresponding to the user, heart rate data and breathing data corresponding to the user, and the like. In this way, after enabling the sports mode on the smartwatch, the user may view the sports watch-face interface on the display of the smartwatch.

In this embodiment of this application, the smartwatch acquires the first expression image of the user in response to the first trigger operation. The first trigger operation may include an enabling operation of the user for the preset working mode, and the preset working mode is used to set a watch-face interface that corresponds to the smartwatch and that includes the dynamic-effect image. For example, the preset working mode may be a depth-of-field mode, and the first trigger operation may be a tap operation of the user for a depth-of-field mode control. For another example, the first trigger operation may be a selection operation that may be performed by the user on a control by using a voice control function and a search function of the smartwatch. The first trigger operation may be considered as an enabling signal for setting a depth-of-field watch-face interface corresponding to the depth-of-field mode. Therefore, after the first trigger operation, the smartwatch starts to execute a corresponding task of setting the depth-of-field watch-face interface.

In some embodiments, the preset working mode is used to set a dynamic watch-face interface that includes the dynamic-effect image and that is of the smartwatch. The dynamic-effect image is generated by the smartwatch triggering the camera to acquire a facial expression of the user after the preset working mode is enabled, or is generated based on preset dynamic effect. It should be noted that a name of the preset working mode is not specifically limited in this embodiment of this application, and the preset working mode may be a dynamic watch-face setting mode or the like.

Figure 8B:
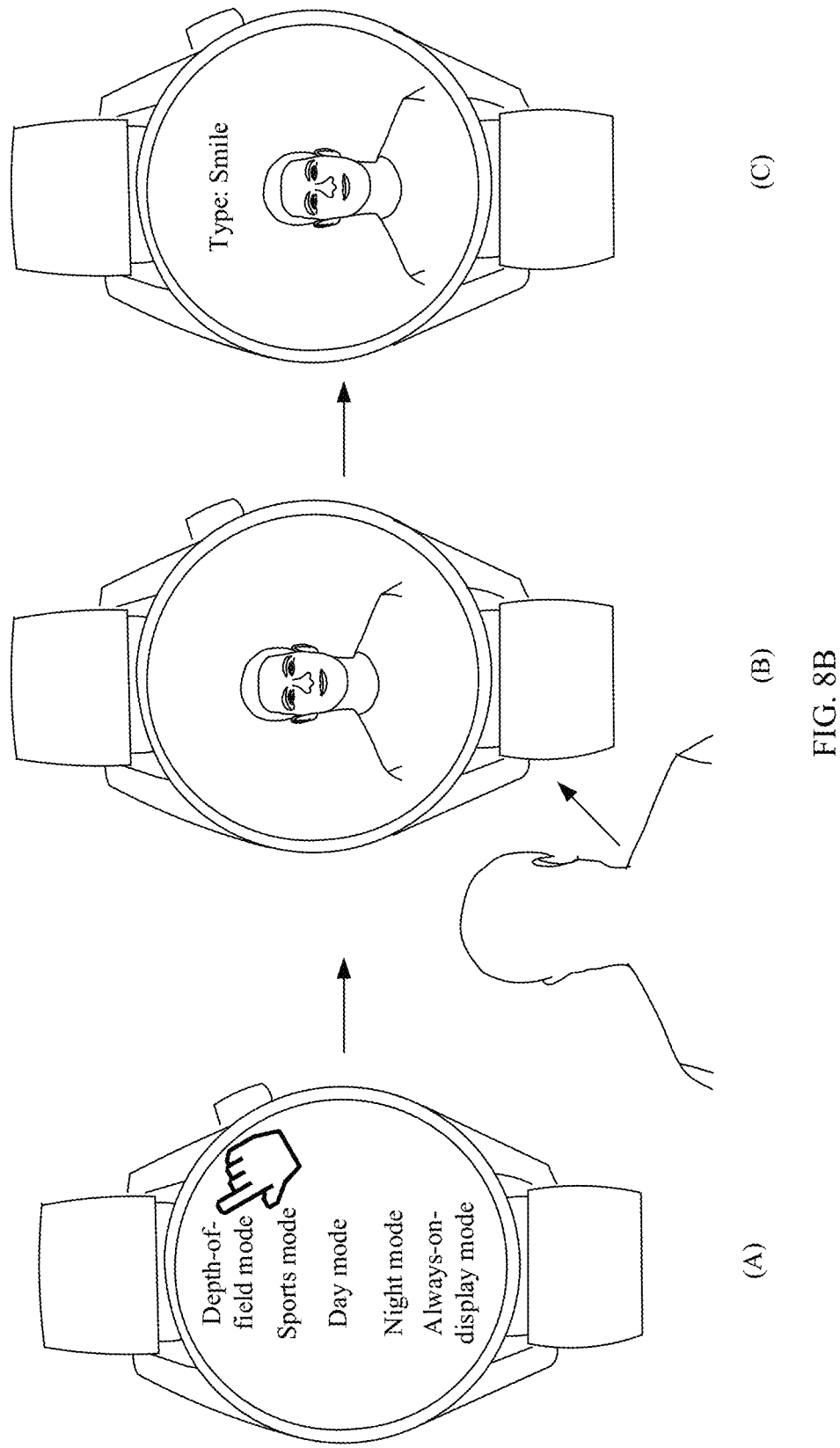
FIG. 8B is an interface diagram of a process of recognizing an expression type according to an embodiment of this application.

In an implementation, description is provided by using an example in which the preset working mode is the foregoing depth-of-field mode. After detecting that the depth-of-field mode is enabled, the smartwatch starts a front-facing camera to acquire the first expression image corresponding to the user (similar to a selfie process). The smartwatch recognizes a user facial expression type in the first expression image in real time based on the first expression image acquired by the camera. Further, initial expression information corresponding to at least one user expression type is obtained. For example, refer to (A) in FIG. 8B. The user may tap the depth-of-field mode control on an interface of the smartwatch, so that the smartwatch detects that the depth-of-field mode is enabled. Then, refer to (B) in FIG. 8B. After detecting that the depth-of-field mode is enabled, the smartwatch displays an acquisition interface and starts the front-facing camera to acquire the first expression image corresponding to the user. Similarly, after the user enables the depth-of-field mode, the user should face the smartwatch and make a corresponding user expression, and a type of the expression is smile. Then, refer to (C) in FIG. 8B. The smartwatch recognizes the acquired first expression image, and obtains initial expression information corresponding to the user expression type being smile.

In an implementation, the smartwatch may acquire the first expression image of the user based on a preset time, and automatically end the acquisition after the preset time expires. Certainly, the smartwatch may further end acquiring the first expression image under an operation of the user. It may be understood that a dynamic change exists in a process of generating an expression by the user. Therefore, each piece of initial expression information not only indicates a facial expression type corresponding to the user, but also may indicate different dynamic effect.

In a feasible implementation, a plurality of expression types may be prestored in the smartwatch. In this way, the smartwatch may identify and determine a specific expression type corresponding to the user in the first expression image based on the plurality of prestored expression types.

In a feasible implementation, after the camera is started, the smartwatch may continuously acquire a plurality of first expression images corresponding to the user, and continuously recognize a plurality of user facial expression types in the first expression images. Certainly, the smartwatch may also start the camera a plurality of times, acquire one first expression image of the user each time, and recognize one user facial expression type in the first expression image.

For example, after the smartwatch detects that the depth-of-field mode is enabled, the user may make one or more facial expressions to the camera. Facial expressions may include types such as smiling, blinking, grinning, sticking a tongue out, nodding, pouting, and frowning. In this way, the smartwatch may start the camera to acquire the corresponding first expression image, and recognize the facial expression of the user in the first expression image, to obtain the initial expression information corresponding to the first expression image. The initial expression information represents an expression type of the first expression image, that is, a facial expression type of the user after the smartwatch detects that the depth-of-field mode is enabled.

Each piece of initial expression information may include an expression type identifier and feature point information corresponding to the expression type. For example, the expression type identifier includes an expression type name, a preset field corresponding to an expression type, an expression type string generated by a smartwatch system, or the like.

For example, initial expression information corresponding to smile may include feature point information corresponding to the expression: "a facial contour key point 0, a mouth key point 1, a nose key point 1, an eye key point 0, and an eyebrow key point 1", a preset field corresponding to the expression: "01", and the like. For another example, initial expression information corresponding to nodding may include feature point information corresponding to the expression: "a facial contour key point 1, a mouth key point 1, a nose key point 0, an eye key point 0, and an eyebrow key point 0", a preset field corresponding to the expression: "03", and the like. For another example, initial expression information corresponding to frowning may include feature point information corresponding to the expression: "a facial contour key point 1, a mouth key point 0, a nose key point 0, an eye key point 0, and an eyebrow key point 1", a preset field corresponding to the expression: "05", and the like. In this way, the initial expression information may indicate a real expression type of the user's face. Feature point information in different initial expression information is different, and therefore, corresponding facial expression types of the user are different. In addition, for a same expression type such as "smile", different users correspond to different actual expressions, and feature point information can accurately represent different "smile" expressions generated by each user.

In another implementation, after detecting that the depth-of-field mode is enabled, the smartwatch starts the front-facing camera to acquire an image video stream of the user. The smartwatch obtains, from the image video stream, a first expression image including a preset quantity of frames. It may be understood that, in a process of recording the image video stream, facial features of each frame of first expression image have slight differences from the first expression image with no expression change, and these slight differences can be combined to dynamically express the facial expression of the user. Further, the same as the foregoing implementation, the smartwatch may obtain initial expression information corresponding to the image video stream based on the acquired image video stream of the user.

In some embodiments, when the facial features on the face generate different expressions, eyes, eyebrows, the nose, and the mouth generate corresponding deformation, and a corresponding deformation feature is correspondingly generated. Therefore, in a process in which the smartwatch identifies the user facial expression type based on the acquired first expression image or the image video stream, the smartwatch may directly perform recognition based on a facial feature of the user's face in the first expression image or the image video stream. For example, the smartwatch may use a recognition model to implement a process of recognizing a user expression. In addition, the recognition model is trained before the recognition model is used to recognize the user expression. During training of the recognition model, a large quantity of first expression images or image video streams may be used as training samples for training. In this way, the recognition model can learn a capability of recognizing a user expression.

In some embodiments, the watch-face mode may be downloaded from a watch-face application market in the smartwatch, or may be customized by the user on the smartwatch. This is not specifically limited in this embodiment of this application.

The smartwatch may further obtain a target image indicated by the user, and the target image may generate a dynamic-effect image in combination with an image type of the first expression image.

In some embodiments, after enabling the preset working mode, the user may access an album application and select a photo in the album, so that the smartwatch obtains the target image indicated by the user.

In a feasible implementation, a path for the user to indicate the target image based on the smartwatch is long. For example, the preset working mode is the depth-of-field mode. Still refer to FIG. 8A. After the user taps the depth-of-field mode control 304 and the smartwatch enables the depth-of-field mode, the user may tap the camera watch-face control 303 on the watch-face market page, to trigger access to the camera watch-face page. Refer to (A) in FIG. 9. The smartwatch displays a camera watch-face page in response to a tap operation. The camera watch-face page includes a watch-face display control 309, a watch-face replacement control 310, and the like. The watch-face display control 309 is used to display a current watch-face interface corresponding to the smartwatch. The watch-face replacement control 310 is used by the user to replace a watch-face corresponding to the smartwatch according to a requirement of the user. The user may tap the watch-face replacement control 310, to replace a current watch face in the smartwatch by using the album application. As shown in (B) in FIG. 9, the smartwatch outputs a watch-face selection page in response to a tap operation of the user on the watch-face replacement control 310. The watch-face selection page is used to prompt the user to select a replacement manner of replacing the current watch face. The replacement manner includes using a photo taken by a photographing application for replacement and using a photo in the album application for replacement. The user may tap a watch-face album control 311 to trigger access to the album application in the smartwatch. As shown in (C) in FIG. 9, the smartwatch displays an album application interface in response to a tap operation on the watch-face album control 311. A plurality of photos are displayed on the album application interface, and the user may perform a third trigger operation on any photo, to set a selected photo to a current watch-face interface corresponding to the smartwatch. Therefore, the user may select a photo in the album application as the target image, to customize a dynamic watch-face interface corresponding to the preset working mode in combination with the target image and a facial expression of the user.

For example, the third trigger operation may include a selection operation of the user for an image, for example, a tap operation of the user for an image in the album application interface. For another example, the third trigger operation may include a selection operation that may be performed by the user on an image by using a voice control function and a search function of the smartwatch.

Therefore, after detecting that the depth-of-field mode is enabled, the smartwatch acquires the first expression image of the user and obtains the target image. Then, the smartwatch sends the image generation request to the server. The image generation request includes the target image and the initial expression information of the first expression image. It may be understood that the target image may include a static face, so that a dynamic-effect image corresponding to the target image is subsequently generated based on the static face and the initial expression information corresponding to the user. Certainly, the target image may alternatively include a face of an animal. The target image is not specifically limited in this embodiment of this application.

After the target image is obtained, in this embodiment of this application, the user may create, based on the acquired user facial expression type and the selected static target image, a depth-of-field watch-face interface that corresponds to the depth-of-field mode and that includes dynamic effect. This improves interaction between the user and the smartwatch, and is not limited to using only a static photo in an album to generate and set a watch-face interface corresponding to a watch face of the smartwatch.

Step S702: The smartwatch sends the image generation request to the server.

The image generation request includes the target image and the initial expression information of the first expression image, and the initial expression information represents an expression type of the first expression image. The image generation request is used to request the server to generate a dynamic-effect image corresponding to the target image based on the target image and the initial expression information.

In some embodiments, the smartwatch recognizes a user facial expression type in the first expression image. In addition, the smartwatch generates corresponding initial expression information based on the expression type of the user. Then, the smartwatch sends the obtained target image and the obtained initial expression information of the first expression image to the server, so that the server generates a dynamic-effect image corresponding to the target image.

In some other embodiments, in a process in which the user interacts with the smartwatch, the user's face centrally faces the smartwatch. Therefore, it is very likely that when the preset mode is enabled in the smartwatch, the first expression image that can be acquired by the camera includes a face corresponding to the user.

However, in some scenarios, it is also possible that after the preset mode is enabled in the smartwatch, the first expression image acquired by the camera does not include a face corresponding to the user.

Therefore, in this embodiment of this application, in a case in which the smartwatch detects that the preset working mode is enabled, the smartwatch may recognize a face in the first expression image in advance based on a facial feature, to determine whether the first expression image includes a face. In a case in which the first expression image acquired by the camera includes or does not include the face corresponding to the user, in addition to the target image and the initial expression information corresponding to the first expression image, the image generation request sent by the smartwatch to the server may further include preset expression information and preset dynamic information that correspond to the preset mode. The preset expression information represents a preset expression type corresponding to the face, and the preset expression type may include anger, fear, surprise, joy, aversion, sadness, and the like. The preset dynamic information represents a dynamic effect type preset for the target image, and the dynamic effect type may include tilt dynamic effect, rotation dynamic effect, and highlight dynamic effect.

In this way, in this embodiment of this application, the smartwatch obtains the facial expression type of the user and the selected target image, so that the smartwatch subsequently independently generates a watch-face page including dynamic effect. In addition, the smartwatch obtains the preset expression type, the preset effect type, and the target image selected by the user, so that the smartwatch can subsequently independently generate a richer and more humanized watch-face page. In addition, when the smartwatch does not recognize the user expression, the smartwatch may still set a depth-of-field watch-face page including dynamic effect.

Step S703: The server renders the target image based on the initial expression information in response to the image generation request, to obtain a dynamic-effect image corresponding to the target image, where dynamic effect of the dynamic-effect image matches the expression type of the first expression image.

In some embodiments, the server performs layer segmentation on an image role corresponding to a human body in the target image and an area other than the face by using a portrait segmentation technology. The image role is located at a first layer, and the area other than the face is located at a second layer. Then, based on the expression information in the image generation request, the image role is driven to execute a corresponding expression by using an expression/portrait driving technology. Finally, the server performs fusion on the first layer and the second layer to generate a dynamic-effect image.

In some other embodiments, the server may further perform layer segmentation on an image role corresponding to a human body in the target image and an area other than the face by using a portrait segmentation technology. The image role is located at a first layer, and the area other than the face is located at a second layer. It may be understood that the first layer includes a foreground area in the target image, and the second layer includes a background area in the target image. The server may drive a portrait at the first layer to perform corresponding dynamic effect. Finally, the server performs fusion on the first layer and the second layer to generate a dynamic-effect image. In this way, the foreground area in the dynamic-effect image may present a dynamic change, but the background area does not present a dynamic change.

It should be noted that, in this embodiment of this application, one or more dynamic-effect images may be obtained based on the initial expression information and the target image. For example, a plurality of dynamic-effect images in a dynamic-effect video may be obtained.

In a feasible implementation, the server forms a dynamic data set by using the obtained dynamic-effect image corresponding to the target image, and the dynamic data set includes at least one dynamic-effect image or dynamic-effect video. It may be understood that the dynamic-effect video may include at least one dynamic-effect image.

Therefore, in a related technology, a fixed algorithm is usually used to convert the target image into the dynamic-effect image. In this way, after a same static photo or a different static photo is converted into a dynamic-effect image, dynamic effect corresponding to the dynamic-effect image is consistent. However, in this embodiment of this application, the target image is converted into a dynamic-effect image based on the acquired user facial expression. Because facial expressions corresponding to each user are inconsistent, if different users select a same target image, dynamic effect in each dynamic-effect image corresponding to the target image is also inconsistent. In this embodiment of this application, a matched watch-face interface that includes dynamic effect may be customized based on feature information corresponding to each user, to improve user experience.

In the foregoing embodiment, the server may render the target image based on the initial expression information in response to the image generation request, to obtain a dynamic-effect image corresponding to the target image. In some other embodiments, the server may further generate a dynamic-effect file corresponding to the target image in response to the image generation request. The dynamic-effect file includes a dynamic-effect image obtained by rendering the target image based on the initial expression information, and dynamic effect of the dynamic-effect image matches the expression type of the first expression image. The dynamic-effect file may further include effect information corresponding to the dynamic-effect image.

In some embodiments, the initial expression information includes initial expression information representing smiling, initial expression information representing blinking, initial expression information representing sticking a tongue out, or the like. For example, the server may drive, based on initial expression information corresponding to smile, the image role to execute a smile expression, to generate the dynamic-effect image. For another example, the server may drive, based on initial expression information corresponding to blink, the image role to execute a blink expression, to generate the dynamic-effect image.

For example, the preset dynamic information includes preset dynamic information representing tilt dynamic effect, preset dynamic information representing rotation dynamic effect, and preset dynamic information representing highlight dynamic effect. For example, the server may drive, based on the preset dynamic information corresponding to the highlight dynamic effect, the image role to execute a face highlight task, to generate a dynamic-effect image. For another example, the server may drive, based on the preset dynamic information corresponding to the tilt dynamic effect, the target image to execute a tilt task at different angles, to generate a dynamic-effect image. For another example, the server may drive, based on the preset dynamic information corresponding to the rotation dynamic effect, the target image to execute an anti-clockwise rotation task or a clockwise rotation task, to generate a dynamic-effect image.

A dynamic-effect image that matches the user facial expression can be generated based on feature point information in the initial expression information. In addition, the smartwatch displays a watch-face interface including the dynamic-effect image on the display, so that more personalized and diversified watch-face interfaces can be provided for the user.

It can be learned that in this embodiment of this application, an image role in the target image may be driven, based on the user facial expression type and the selected target image, to execute the facial expression type corresponding to the user, and a corresponding dynamic-effect image is generated. In addition, in a case in which the smartwatch does not acquire the user facial expression, in this embodiment of this application, the target image may be further driven to execute a corresponding task based on the preset expression information, the preset dynamic information, and the target image, and a corresponding dynamic-effect image is generated. Further, the dynamic-effect image obtained by the smartwatch has a personalized element of the user, and therefore, a watch-face interface that is set and displayed is also a watch-face interface that has a personalized element of the user. This can enrich forms of the watch face, and enhance diversity of forms of the watch-face interface.

In some embodiments, the smartwatch side may not send the image generation request to the server, and the smartwatch side may also perform the foregoing process of generating the dynamic-effect image based on the initial expression information and the target image. An execution body of the process of generating the dynamic-effect image is not specifically limited in this embodiment of this application.

Step S704: The server sends the dynamic-effect image to the smartwatch.

In some embodiments, after generating the dynamic-effect image, the server may send the dynamic-effect image to the smartwatch. Each dynamic-effect image may correspond to effect information, and the effect information represents an expression type in the dynamic-effect image or a corresponding dynamic effect type in the dynamic-effect image. The dynamic effect type may include tilt dynamic effect, rotation dynamic effect, highlight dynamic effect, and the like. The effect information may include an expression type identifier and feature point information or an effect type identifier and corresponding feature point information. For example, the expression type identifier includes an effect type name, a preset field corresponding to effect, an effect string generated by a smartwatch system, or the like; and the effect type identifier includes an effect type name, a preset field corresponding to effect, an effect string generated by a smartwatch system, or the like.

Based on the foregoing, the server may generate a dynamic-effect file corresponding to the target image in response to the image generation request. In some other embodiments, the server may alternatively send the dynamic-effect file to the smartwatch.

After receiving the dynamic-effect image, the smartwatch automatically generates a watch face including the dynamic image.

Alternatively, after receiving the dynamic-effect image, the smartwatch sets, in response to an indication operation of the user, a watch-face interface including the dynamic-effect image.

Figure 9:
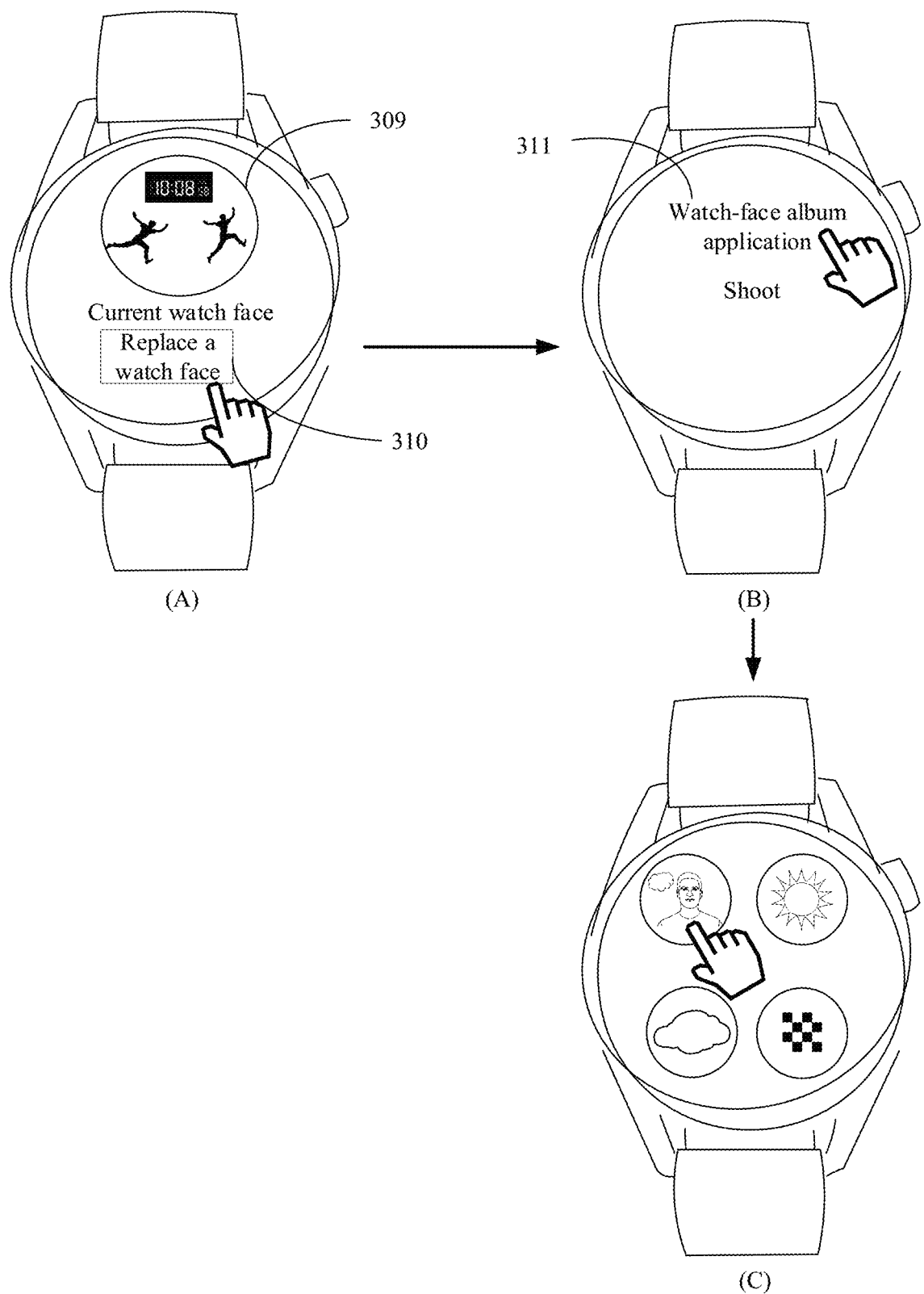
FIG. 9 is an interface diagram of another process of setting a watch-face interface according to an embodiment of this application.
Figure 10:
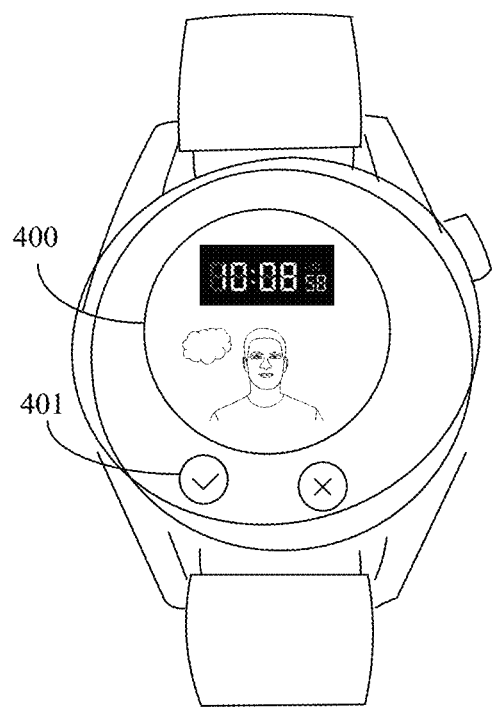
FIG. 10 is an interface diagram of a preview watch-face interface according to an embodiment of this application.

For example, still refer to (C) in FIG. 9. The smartwatch displays a preview watch-face interface based on the received dynamic-effect image. FIG. 10 is a diagram of a preview watch-face interface according to an embodiment of this application. Refer to FIG. 10. The preview watch-face interface includes an image previewing control 400 and image determining controls 401. The image previewing control 400 is used by the smartwatch to preview a watch-face interface corresponding to the target image selected by the user. The image determining control 401 is used to set a watch-face interface including the dynamic-effect image as a current watch-face interface by the smartwatch after tapping of the user. In this way, in a process of using the smartwatch by the user, the smartwatch presents a set watch-face interface, and content displayed on the watch-face interface includes the dynamic-effect image.

In some embodiments, the smartwatch may collect a plurality of expression types corresponding to the user. Then, the server may generate a plurality of dynamic-effect images, and each dynamic-effect image corresponds to a different expression type. In this way, the smartwatch may display a watch-face interface corresponding to at least one dynamic-effect image based on the plurality of dynamic-effect images.

Figure 11:
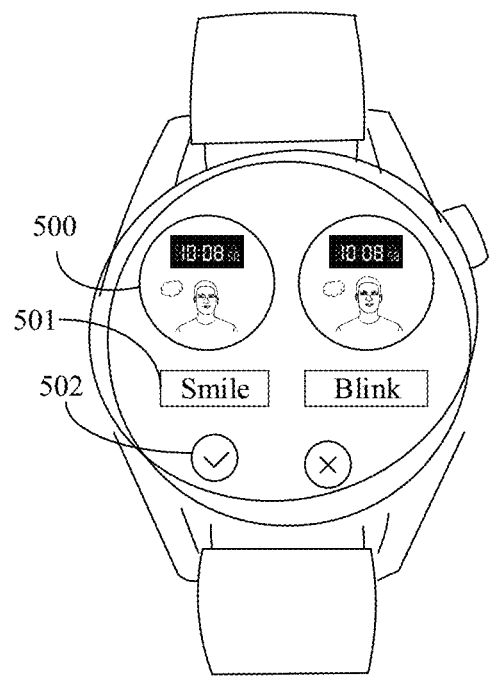
FIG. 11 is an interface diagram of another preview watch-face interface according to an embodiment of this application.

In a feasible implementation, FIG. 11 is a diagram of another preview watch-face interface according to an embodiment of this application. After responding to the first trigger operation, the smartwatch displays a preview watch-face interface. Refer to FIG. 11. The preview watch-face interface includes a plurality of image previewing controls 500, effect information controls 501, and image determining controls 502. The image previewing control 500 is used to preview at least one watch-face interface that includes the dynamic-effect image. For example, the preview watch-face interface includes a watch-face interface corresponding to smiling, a watch-face interface corresponding to blinking, a watch-face interface corresponding to sticking a tongue out, and the like. The effect information control 501 is used to display effect information corresponding to the dynamic-effect image. For example, the preview watch-face interface includes the watch-face interface corresponding to smile, and the effect information control 501 displays effect information corresponding to smile, for example, "Smile". The image determining control 502 is used to set, after tapping of the user, a watch-face interface corresponding to smiling, a watch-face interface corresponding to blinking, a watch-face interface corresponding to sticking a tongue out, or the like as a current watch-face interface.

In addition, the user may further delete the plurality of image previewing controls 500 and the corresponding effect information controls 501 included in the preview watch-face interface. For example, the user does not want to use the watch-face interface corresponding to smile. In this case, the user may delete the image previewing control 500 and the corresponding effect information control 501 that correspond to the watch-face interface. Then, after the user taps the image determining control 502, the watch-face interface corresponding to blinking, the watch-face interface corresponding to sticking a tongue out, or the like is set as a current watch-face interface.

Figure 12:
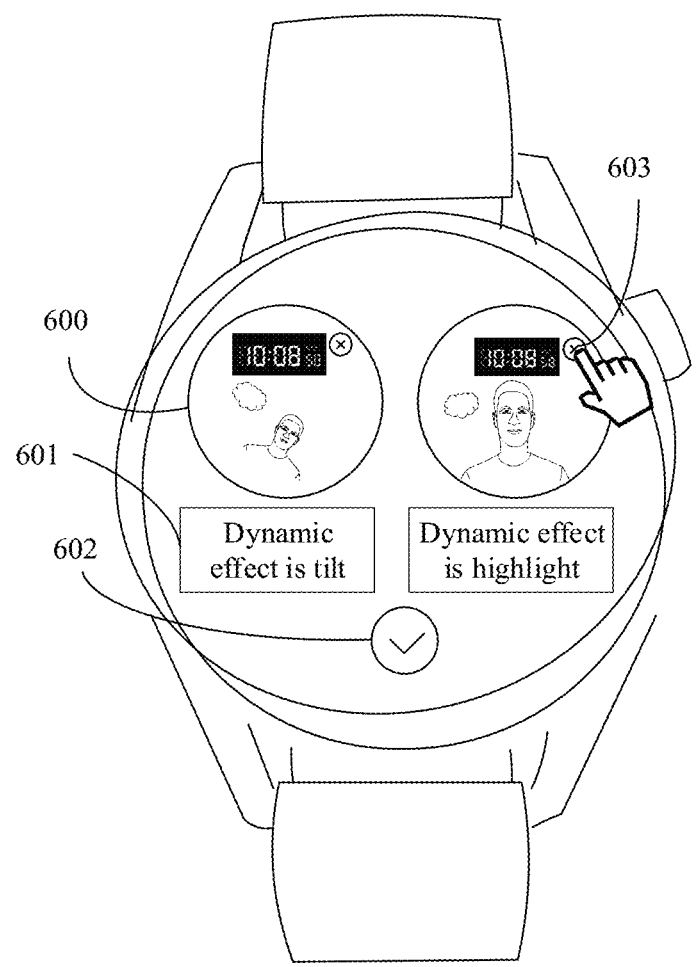
FIG. 12 is an interface diagram of another preview watch-face interface according to an embodiment of this application.

In some other embodiments, FIG. 12 is a diagram of another preview watch-face interface according to an embodiment of this application. After responding to the first trigger operation, the smartwatch displays a preview watch-face interface. Refer to FIG. 12. The preview watch-face interface includes a plurality of image previewing controls 600, effect information controls 601, an image determining control 602, and image deletion controls 603. The image previewing control 600 is used to preview at least one watch-face interface that includes the dynamic-effect image. For example, the preview watch-face interface includes a watch-face interface corresponding to a preset expression, a watch-face interface corresponding to tilt dynamic effect, a watch-face interface corresponding to rotation dynamic effect, a watch-face interface corresponding to highlight dynamic effect, and the like. The effect information control 601 is used to display effect information corresponding to the dynamic-effect image. For example, the preview watch-face interface includes the watch-face interface corresponding to tilt dynamic effect, and the effect information control 601 displays effect information corresponding to tilting, for example, "Dynamic effect is tilt". The image determining control 602 is used to set, after tapping of the user, the watch-face interface corresponding to the preset expression, the watch-face interface corresponding to tilt dynamic effect, the watch-face interface corresponding to rotation dynamic effect, a watch-face interface corresponding to highlight dynamic effect, or the like as the current watch-face interface.

It can be learned that the smartwatch in this embodiment of this application may preview, in the user interface, at least one watch-face interface including the dynamic-effect image. The preview watch-face interface may include a watch-face interface corresponding to the initial expression information of the first expression image, and may further include a watch-face interface corresponding to the preset expression information and a watch-face interface corresponding to the preset dynamic information. While previewing the watch-face interface, the smartwatch further allows the user to delete a watch-face interface that the user does not like. For example, the user may tap the image deletion control 603 corresponding to the dynamic-effect image. After the user completes deletion, the user may tap the image determining control 602, so that a final result is set to the current watch-face interface. In this way, the user may preview and determine a watch-face interface that can be used and set in combination with a facial expression of the user, to implement a personalized dynamic watch-face interface, thereby improving user experience.

Step S705: The smartwatch displays a corresponding watch-face interface based on an acquired second expression image after detecting a second trigger operation, where the watch-face interface includes the dynamic-effect image that matches an expression type of the second expression image.

In some embodiments, the smartwatch acquires the second expression image of the user after detecting the second trigger operation. Then, the smartwatch recognizes the expression type of the second expression image. Finally, the smartwatch displays the corresponding watch-face interface based on target expression information, where the target expression information represents the expression type of the second expression image.

In some embodiments, the second trigger operation includes a screen-on operation of the user for the smartwatch, and that the user performs the second trigger operation may be considered as that the user wants to interact with the watch. The screen-on operation includes: the user lifts a wrist wearing the smartwatch to the front of the user's face, or the user lifts a wrist wearing the smartwatch and the user lowers the head. It may be understood that, in an actual use scenario, when the user wants to interact with the smartwatch, a screen-on operation is usually triggered. After the smartwatch detects the screen-on operation, it may be indicated that the user wants to view a watch-face interface. In this case, the smartwatch displays the watch-face interface.

Figure 13:
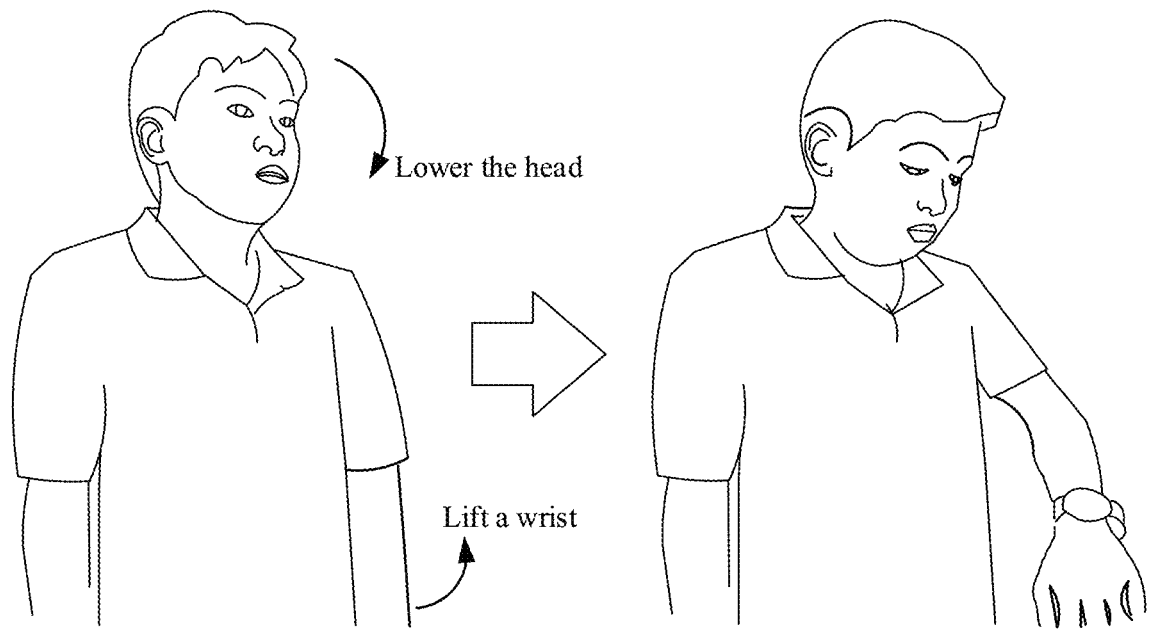
FIG. 13 is a diagram of a scenario for a second trigger operation according to an embodiment of this application.
Figure 14:
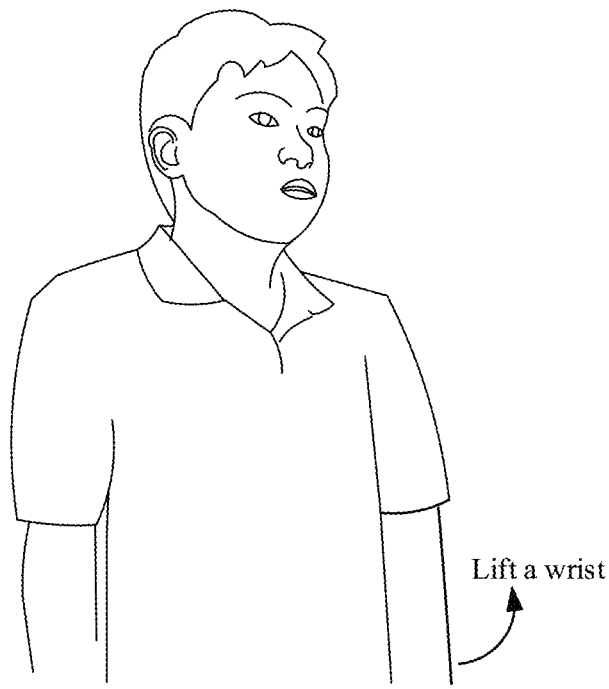
FIG. 14 is a diagram of another scenario for a second trigger operation according to an embodiment of this application.

When the user wants to interact with the watch, the user usually first triggers the watch to turn on a screen, and then looks at the watch. For example, as shown in FIG. 13, the screen-on operation of the user for the smartwatch may include: the user lifts a wrist, to trigger the smartwatch to turn on the screen. When the user lifts the wrist to look at the watch, the head and hand usually move at the same time: lowers the head and lifts the hand. In some embodiments, the screen-on operation of the user for the smartwatch may include lifting the wrist and lowering the head. Alternatively, the user may lift only the hand to the front of the head. For example, as shown in FIG. 14, the user may lift only the hand and move to the front of the head.

A purpose of lifting the wrist by the user is usually to make the worn smartwatch closer to the user's head, to facilitate viewing and operation by the user. In some embodiments, when the second trigger operation includes a screen-on operation of the user for the smartwatch, the smartwatch may display a corresponding watch-face interface based on the second trigger operation.

It may be understood that the smartwatch may also include a gyroscope sensor, an acceleration sensor, a magnetic sensor, a distance sensor, and the like that measure hand posture data of the user. The gyroscope sensor included in the smartwatch is used as an example. The gyroscope sensor may detect posture data of the hand of the user in real time. For example, when determining whether the user lifts the wrist, the smartwatch may determine, based on a first preset angle, whether the user lifts the wrist. To be specific, when the user's wrist is lifted towards the user's face, an included angle between an arm and a horizontal line is greater than or equal to the first preset angle. This is not specifically limited in this embodiment of this application.

In some embodiments, after the smartwatch detects the second trigger operation, if a device status of the smartwatch is not a tilted state or a rotation state, the smartwatch displays a corresponding watch-face interface based on the acquired second expression image.

In some embodiments, after detecting the second trigger operation, the smartwatch starts the camera to collect the second expression image of the user, and recognizes a user facial expression type in the second expression image. In this way, target expression information corresponding to the user facial expression type is obtained. Then, the smartwatch compares the target expression information of the second expression image with effect information of the dynamic-effect image, where the effect information represents an expression type in the dynamic-effect image. A watch-face interface including the dynamic-effect image is displayed if the target expression information of the second expression image matches the effect information of the dynamic-effect image.

In a feasible implementation, the target expression information and the effect information include expression type identifiers. The smartwatch may compare the expression type identifier of the target expression information with the expression type identifier of the effect information. If the expression type identifier of the target expression information matches the expression type identifier of the effect information, it is determined that the target expression information of the second expression image matches the effect information of the dynamic-effect image. Certainly, other information corresponding to the target expression information may also be matched with other information corresponding to the effect information.

Specifically, the smartwatch may include a dynamic data set, and the dynamic data set includes a dynamic-effect image. If an expression type corresponding to the target expression information matches an expression type corresponding to effect information in a dynamic-effect image, a watch-face interface including the dynamic-effect image is displayed.

Figure 15:
FIG. 15 is a diagram of a watch-face interface including a dynamic-effect image corresponding to smile according to an embodiment of this application.

For example, refer to FIG. 15. If the facial expression type of the user in the second expression image is smile, the smartwatch generates target expression information representing smile. Then, the smartwatch compares the target expression information with effect information in the received dynamic-effect image. If the effect information includes smile, the smartwatch displays a watch-face interface including the smile on the display screen.

In an implementation, the target expression information and the effect information include feature point information.

In a process in which the smartwatch matches the target expression information with the effect information of the dynamic-effect image, the smartwatch compares the feature point information of the target expression information with the feature point information of the effect information. If the feature point information in the target expression information is the same as the feature point information in the effect information, it may also be determined that the target expression information matches the effect information.

In another implementation, in a process in which the smartwatch matches the target expression information with the effect information of the dynamic-effect image, the smartwatch compares a similarity between the feature point information in the target expression information and the feature point information in the effect information. If the similarity between the feature point information in the target expression information and the feature point information in the effect information is greater than or equal to a first preset threshold, it is determined that the target expression information matches the effect information.

It should be noted that an implementation process of matching the target expression information with the effect information is not specifically limited in this embodiment of this application.

In some other embodiments, the smartwatch stores a matching correspondence between an expression type of the target expression information and an expression type of the dynamic-effect image. For example, an expression type in the matching correspondence may be an opposite expression type with a large emotion difference. For example, sadness matches and corresponds to smile. For example, the target expression information indicates that a current facial expression type of the user is sadness, and an expression type of a matching dynamic-effect image displayed by the smartwatch is smile, to encourage and comfort the user.

In some other embodiments, in a process in which the smartwatch matches the target expression information with the effect information in the dynamic-effect image, the smartwatch may compare a similarity between the feature point information in the target expression information and the feature point information in the effect information. If the similarity is small and a difference is large, it is determined that the target expression information matches the effect information. If the similarity between the feature point information in the target expression information and the feature point information in the effect information is less than or equal to a second preset threshold, it is determined that the target expression information matches the effect information. For example, if the target expression information indicates that the current facial expression type of the user is sad, the expression type indicated by the effect information is smile, and the similarity between the feature point information in the target expression information and the feature point information in the effect information is less than or equal to 10%, the target expression information matches the effect information. In this way, if the facial expression type indicated by the target expression information generated by the smartwatch is sad, a watch-face interface including smile dynamic effect is displayed. In an actual scenario, the user is currently in a depressed mood and makes a sad expression to the watch face, and the smartwatch may display a watch-face interface including a smile expression. This can encourage the user and enhance interest, to attract the user to interact with the smartwatch.

In some other embodiments, the smartwatch displays a watch-face interface including the target image if the target expression information of the second expression image does not match the effect information of the dynamic-effect image. For example, if the smartwatch does not recognize the user expression in the acquired second expression image, the smartwatch may control the display to display a watch-face interface including the target image or the preset expression type. In other words, after the user inputs the second trigger operation on the smartwatch, if the user's face does not face the smartwatch, the smartwatch may display a corresponding static watch-face interface based on the target image selected by the user. Certainly, after the user inputs the second trigger operation on the smartwatch, if the user's face does not face the smartwatch, the smartwatch may further display a watch-face interface including the preset expression type.

In some embodiments, if the device status of the smartwatch is not the tilted state or the rotation state, a watch-face interface with superimposed dynamic effect may also be displayed based on the acquired second expression image. The superimposed dynamic effect includes highlight dynamic effect and dynamic effect that matches the expression type of the second expression image. The dynamic-effect image on the watch-face interface presents a cyclic change from expansion to contraction and from contraction to expansion. In other words, if the device status of the smartwatch is not the tilted state or the rotation state, the watch-face interface with the superimposed dynamic effect may also be displayed based on the second expression image of the user. For example, the dynamic-effect image on the watch-face interface matches the expression type of the user, and presents a cyclic change from expansion to contraction and from contraction to expansion at the same time.

In some embodiments, if the smartwatch is in the tilted state, the watch-face interface with the superimposed dynamic effect may also be displayed based on the acquired second expression image. The superimposed dynamic effect includes tilt dynamic effect and dynamic effect that matches the expression type of the second expression image. The dynamic-effect image displayed on the watch-face interface presents a tilt change in a horizontal direction and/or a vertical direction within a preset angle.

In some embodiments, if the smartwatch is in the rotation state, the watch-face interface with the superimposed dynamic effect is displayed based on the acquired second expression image. The superimposed dynamic effect includes rotation dynamic effect and dynamic effect that matches the expression type of the second expression image. The dynamic-effect image on the watch-face interface presents a rotation change in a clockwise direction or an anti-clockwise direction.

It can be learned that after detecting the second trigger operation, the smartwatch provided in this embodiment of this application displays a watch-face interface with different dynamic effect. In addition, each time the watch-face interface is displayed, dynamic effect may be determined based on a current facial expression of the user. This improves interaction and interest between the user and the smartwatch, and avoids a single style of the watch-face interface.

In some other embodiments, after the smartwatch detects the second trigger operation, if the device status of the smartwatch is the tilted state or the rotation state, a corresponding watch-face interface is displayed based on the device status of the smartwatch.

Figure 17:
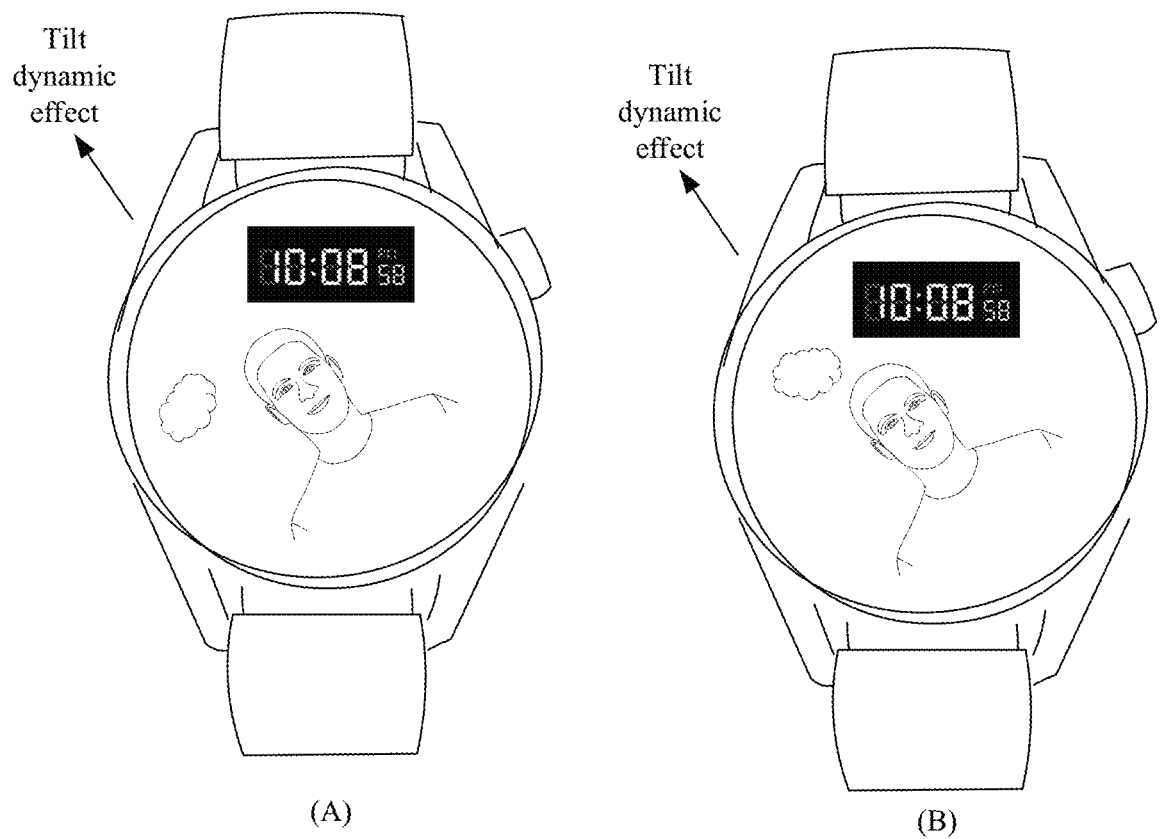
FIG. 17 is a diagram of a watch-face interface including a dynamic-effect image of tilt dynamic effect according to an embodiment of this application.

For example, if the smartwatch is in the tilted state, the watch-face interface with tilt dynamic effect is displayed. The watch-face interface includes the target image, and the target image presents a tilt change in a horizontal direction and/or a vertical direction within a preset angle. Refer to (A) in FIG. 17. When the smartwatch is in the tilted state, the displayed watch-face interface includes a dynamic-effect image of tilt dynamic effect. Alternatively, refer to (B) in FIG. 17. The dynamic-effect image may include a foreground area and a background area. The foreground area includes a portrait area, and the background area includes another area other than the portrait area. When the smartwatch is in the tilted state, the foreground area of the dynamic-effect image in the displayed watch-face interface may present a tilt change, and the background area may not present a change. In this way, dynamic display effect of the portrait area is highlighted, and a dynamic-effect image with a more stereoscopic sense is presented to the user.

Figure 16:
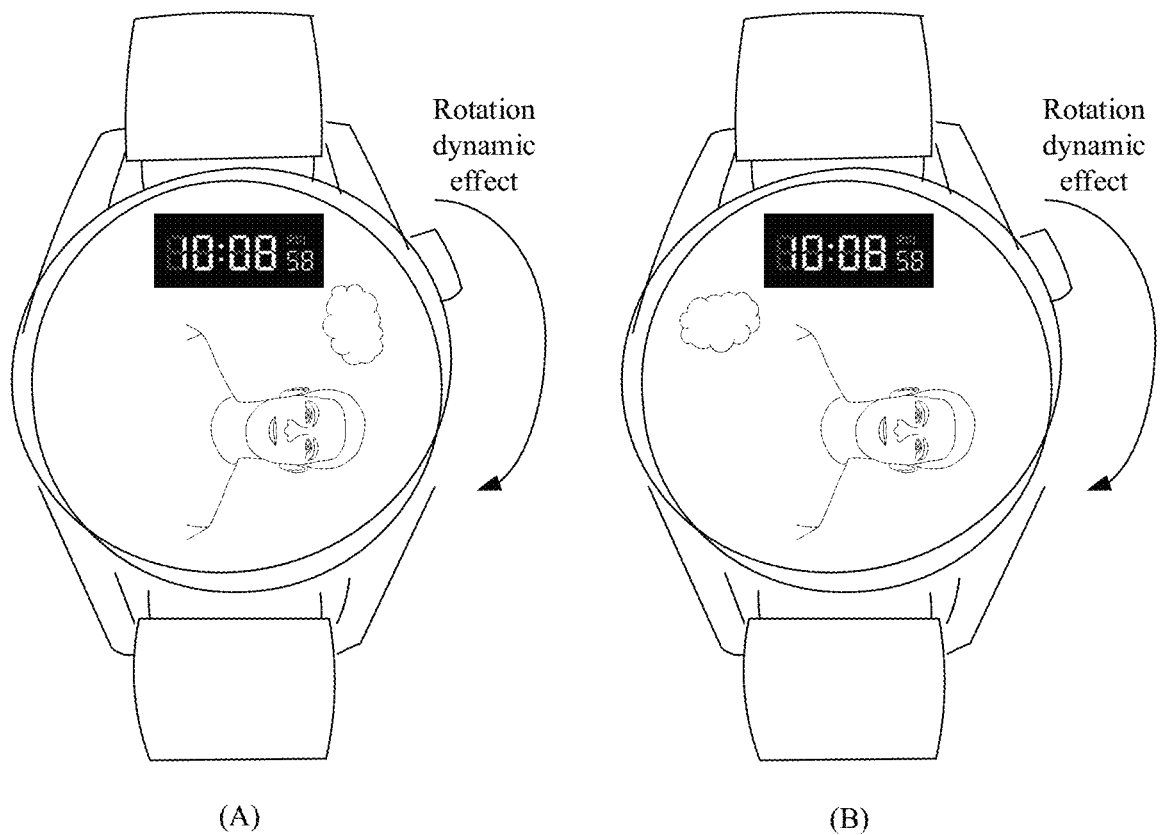
FIG. 16 is a diagram of a watch-face interface including a dynamic-effect image of rotation dynamic effect according to an embodiment of this application.

For example, if the smartwatch is in the rotation state, the watch-face interface with rotation dynamic effect is displayed. The watch-face interface includes the target image, and the target image presents a rotation change in a clockwise direction or an anti-clockwise direction. Refer to (A) in FIG. 16. When the smartwatch is in the rotation state, the displayed watch-face interface includes a dynamic-effect image of rotation dynamic effect. Alternatively, refer to (B) in FIG. 16. When the smartwatch is in the rotation state, the foreground area of the dynamic-effect image in the displayed watch-face interface may present a rotation change, and the background area may not present a change. In this way, dynamic display effect of the portrait area is highlighted, and a dynamic-effect image with a more stereoscopic sense is presented to the user.

It can be learned that in this embodiment of this application, a corresponding watch-face interface may be further displayed based on the device status, or a corresponding watch-face interface may be displayed in combination with a current facial expression of the user and the device status. In addition, in a process in which the smartwatch displays the watch-face interface, the foreground area of the dynamic-effect image on the watch-face interface may present dynamic effect, and the background area may not present dynamic effect. In this way, this can not only improve diversity of styles of the watch-face interface, but also can improve interaction between the user and the smartwatch.

Still with reference to the interaction system shown in FIG. 3, an example in which the interaction system includes a first device, a second device, and a server is used. The first device is a smartwatch, and the second device is a mobile phone. The display method for a watch-face interface provided in this embodiment of this application is described.

Figure 18:
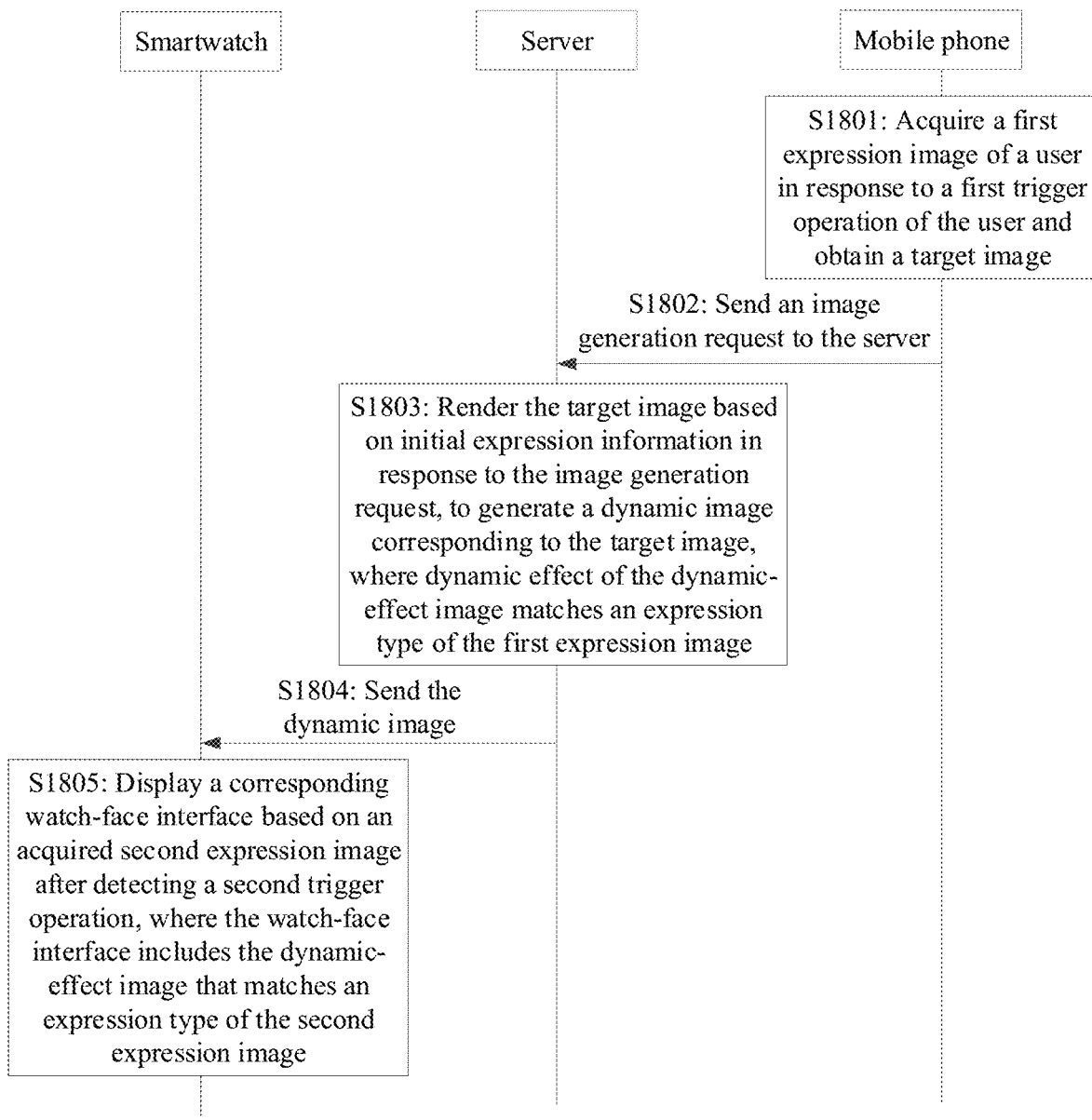
FIG. 18 is an interaction diagram of a display method for a watch-face interface according to an embodiment of this application.

FIG. 18 is an interaction diagram of another display method for a watch-face interface according to an embodiment of this application. As shown in FIG. 18, in some other embodiments, steps S701 and S702 may be replaced with steps S1801 and S1802.

Step S1801: A mobile phone acquires a first expression image of a user in response to a first trigger operation of the user and obtains a target image.

Step S1802: The mobile phone sends an image generation request to the server.

The image generation request includes the target image and initial expression information of the first expression image, and the initial expression information represents an expression type of the first expression image. The image generation request is used to request the server to generate a dynamic-effect image corresponding to the target image based on the target image and the initial expression information.

In some embodiments, the mobile phone may establish a communication connection to the smartwatch, and a camera is also disposed in the mobile phone. In this case, the user may also enable a preset working mode of the smartwatch on the mobile phone side, for example, a depth-of-field mode, and select the target image. In this way, after detecting that the preset working mode is enabled, the mobile phone starts a front-facing camera to acquire the first expression image corresponding to the user, and recognizes a user expression type in the first expression image. Further, initial expression information corresponding to at least one user expression type is obtained. Finally, the mobile phone sends the target image and the initial expression information to the server. In this way, the server generates a dynamic-effect image corresponding to the target image based on the target image and the initial expression information, and displays the dynamic-effect image on a watch-face interface of the smartwatch.

In this embodiment of this application, step S1803 to step S1805 are similar to step S703 to step S705 in the method shown in FIG. 7, and details are not described herein again.

In a feasible implementation, the server may prestore an association relationship between the mobile phone and the smartwatch. In this way, after receiving the image generation request sent by the mobile phone, the server may directly send the dynamic-effect image to the smartwatch associated with the mobile phone.

In another implementation, the mobile phone may alternatively send the image generation request and a device identifier of the associated smartwatch to the server. In this way, after receiving the image generation request and the device identifier of the associated smartwatch, the server may directly send the dynamic-effect image to the smartwatch indicated by the device identifier.

In some other embodiments, no camera may be disposed in the smartwatch. In a case in which no camera is disposed in the smartwatch, the mobile phone sends the image generation request to the server in response to the first trigger operation. The image generation request includes the target image and preset dynamic information, and the preset dynamic information represents a preset dynamic effect type for the target image. Then, the server renders the target image based on the preset dynamic information in response to the image generation request, to generate a dynamic-effect image corresponding to the target image, where dynamic effect of the dynamic-effect image matches a dynamic effect type. Then, the server sends the dynamic-effect image to the smartwatch. The smartwatch displays a corresponding watch-face interface after detecting the second trigger operation, where the watch-face interface includes a dynamic-effect image that matches the dynamic effect type.

In other words, the image generation request sent by the mobile phone to the server may include the preset dynamic information and the target image that correspond to the preset working mode. The server renders the target image based on the preset dynamic information, to obtain the dynamic-effect image corresponding to the target image. Then, the server sends the dynamic-effect image to the smartwatch.

Based on the foregoing embodiment, the mobile phone sends the target image and the preset dynamic information to the server. In some other embodiments, the mobile phone may alternatively send only the target image to the server. The preset dynamic information may be pre-stored in the server, so that the server subsequently generates the dynamic-effect image corresponding to the target image based on the pre-stored preset dynamic information.

In some embodiments, the server may further send the generated dynamic-effect image to the mobile phone, and the mobile phone may send the dynamic-effect image to the smartwatch, so that the smartwatch displays a dynamic watch-face interface that has been set up. The mobile phone may display a preview watch-face interface. For the preview watch-face interface, refer to (C) in FIG. 9. Details are not described herein again. The user may further use and set a current watch-face interface based on a requirement of the user after previewing a watch-face interface on the mobile phone side, to implement a personalized dynamic watch-face interface.

Similarly, after detecting the second trigger operation, the smartwatch displays a corresponding watch-face interface based on the device status of the smartwatch, where the watch-face interface includes the dynamic-effect image.

Figure 19:
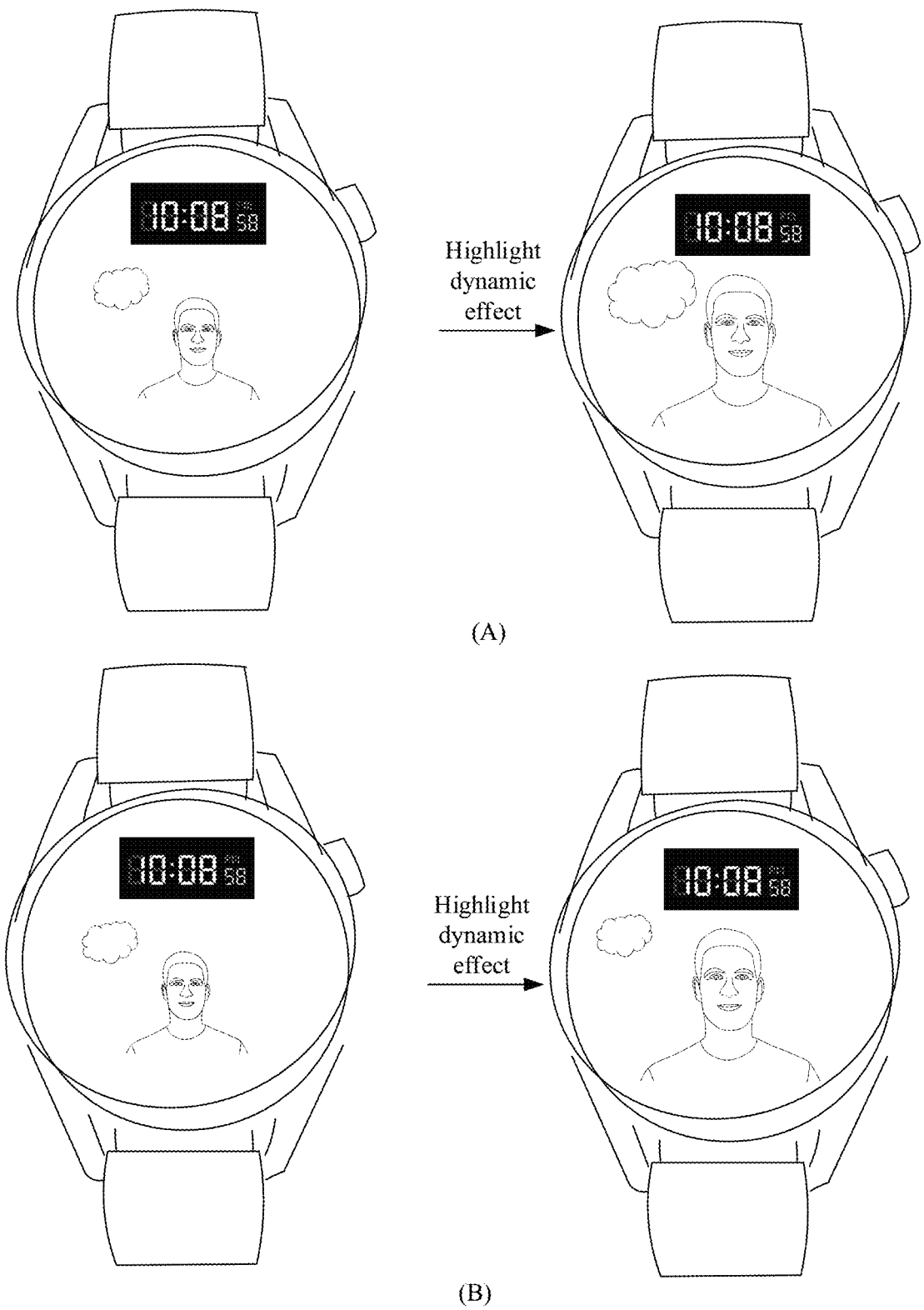
FIG. 19 is a diagram of a watch-face interface including a dynamic-effect image of highlight dynamic effect according to an embodiment of this application.

For example, the second trigger operation includes a screen-on operation of the user for the smartwatch. In a case in which the smartwatch is not in a tilted state or a rotation state, the watch-face interface with highlight dynamic effect is displayed. The dynamic-effect image on the watch-face interface presents a cyclic change from expansion to contraction and from contraction to expansion. Refer to (A) in FIG. 19. In a case in which the smartwatch detects the screen-on operation of the user for the smartwatch, and the smartwatch is not in the tilted state or the rotation state, the displayed watch-face interface includes a dynamic-effect image of highlight dynamic effect. Alternatively, refer to (B) in FIG. 19. The dynamic-effect image includes a foreground area and a background area. The foreground area includes a portrait area, and the background area includes another area other than the portrait area. When the smartwatch is not in the tilted state or the rotation state, the foreground area of the dynamic-effect image in the watch-face interface displayed by the smartwatch may present a cyclic change, and the background area may not present a change. In this way, dynamic display effect of the portrait area is highlighted, and a dynamic-effect image with a more stereoscopic sense is presented to the user.

In some embodiments, the second trigger operation may further include a screen-on operation of the user for the smartwatch. If the smartwatch is in the tilted state, the watch-face interface with tilt dynamic effect is displayed, and the dynamic-effect image on the watch-face interface presents a tilt change in a horizontal direction and/or a vertical direction within a preset angle. Still refer to (A) in FIG. 17. When the smartwatch detects the screen-on operation of the user for the smartwatch and the smartwatch is in the tilted state, the displayed watch-face interface includes a dynamic-effect image of tilt dynamic effect. Alternatively, refer to (B) in FIG. 17. When the smartwatch detects the screen-on operation of the user for the smartwatch and the smartwatch is in the tilted state, the foreground area of the dynamic-effect image on the displayed watch-face interface presents a tilt change.

In some embodiments, the second trigger operation may further include a screen-on operation of the user for the smartwatch. If the smartwatch is in the rotation state, the watch-face interface with rotation dynamic effect is displayed. The dynamic-effect image on the watch-face interface presents a rotation change in a clockwise direction or an anti-clockwise direction. Still refer to (A) in FIG. 16. When the smartwatch detects the screen-on operation of the user for the smartwatch and the smartwatch is in the rotation state, the displayed watch-face interface includes a dynamic-effect image of rotation dynamic effect. Alternatively, refer to (B) in FIG. 16. When the smartwatch detects the screen-on operation of the user for the smartwatch and the smart-watch is in the rotation state, the foreground area of the dynamic-effect image on the displayed watch-face interface presents a rotation change.

It can be learned that the display method for a watch face provided in this embodiment of this application may be applied to an interaction system including a mobile phone, a smartwatch, and a server. In addition, when no camera is disposed on the smartwatch, a corresponding dynamic watch-face interface may still be displayed based on the target image selected by the user and the input second trigger operation. This implements a personalized dynamic watch-face interface, thereby improving user experience.

Still with reference to the interaction system shown in FIG. 3, an example in which the interaction system includes a first device, a second device, and a server is used. The first device is a smartwatch, and the second device is a mobile phone. The display method for a watch-face interface provided in this embodiment of this application is described.

Figure 20:
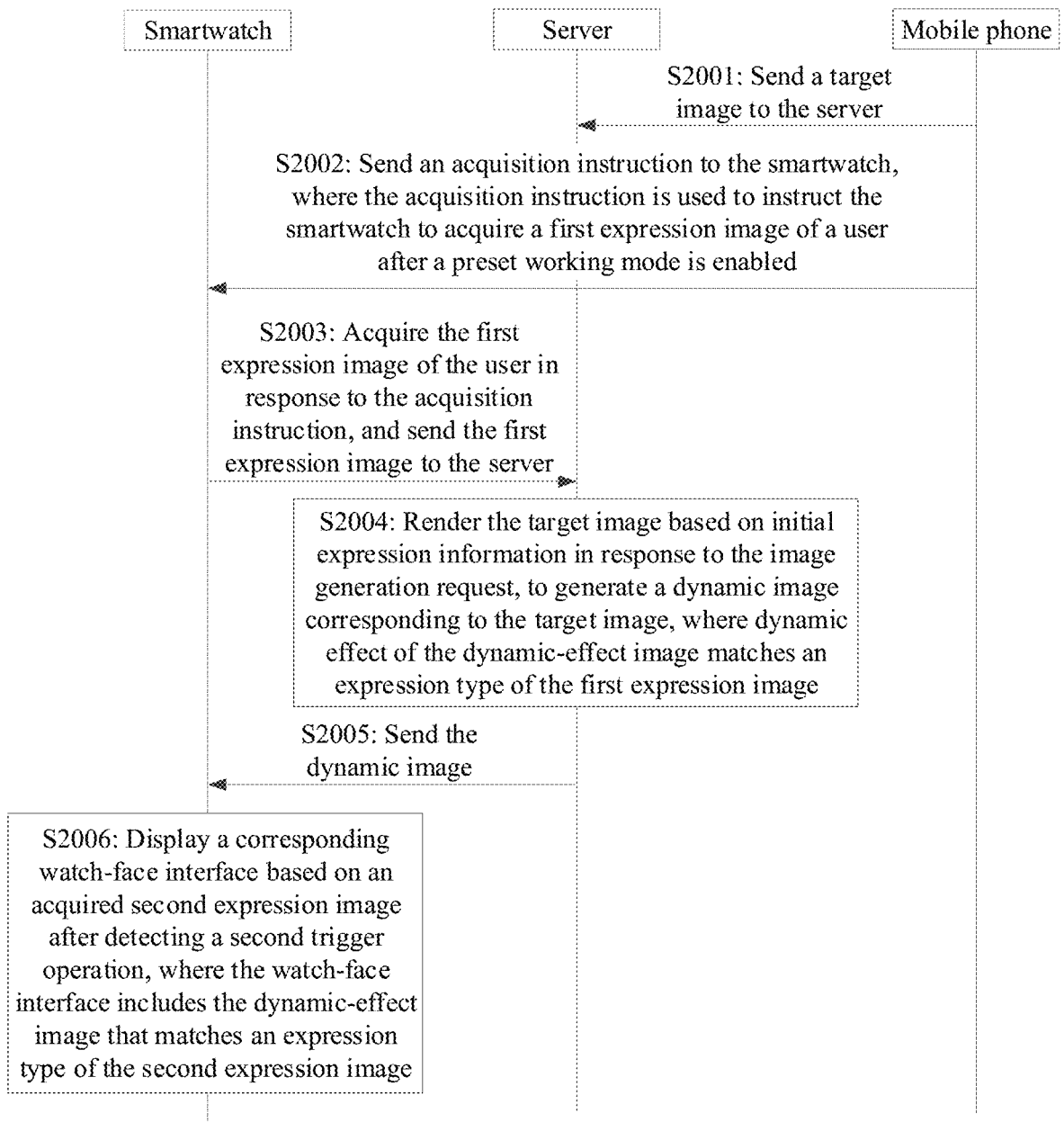
FIG. 20 is an interaction diagram of a display method for a watch-face interface according to an embodiment of this application.

FIG. 20 is an interaction diagram of another display method for a watch-face interface according to an embodiment of this application. As shown in FIG. 20, in some other embodiments, steps S1801 and S1802 may be replaced with steps S2001 to S2003.

Step S2001: A mobile phone sends a target image to a server.

Step S2002: The mobile phone sends an acquisition instruction to a smartwatch, where the acquisition instruction is used to instruct the smartwatch to acquire a facial expression corresponding to a user after a preset working mode is enabled.

Step S2003: The smartwatch acquires a first expression image of the user in response to the acquisition instruction, and sends the first expression image to the server.

In some embodiments, when a camera is disposed in the smartwatch, the user may select a static target image on the mobile phone side and acquire a facial expression of the user on the smartwatch side. It may be understood that, in the foregoing implementation, both the smartwatch and the mobile phone should enable a preset working mode, for example, a depth-of-field mode.

Figure 21:
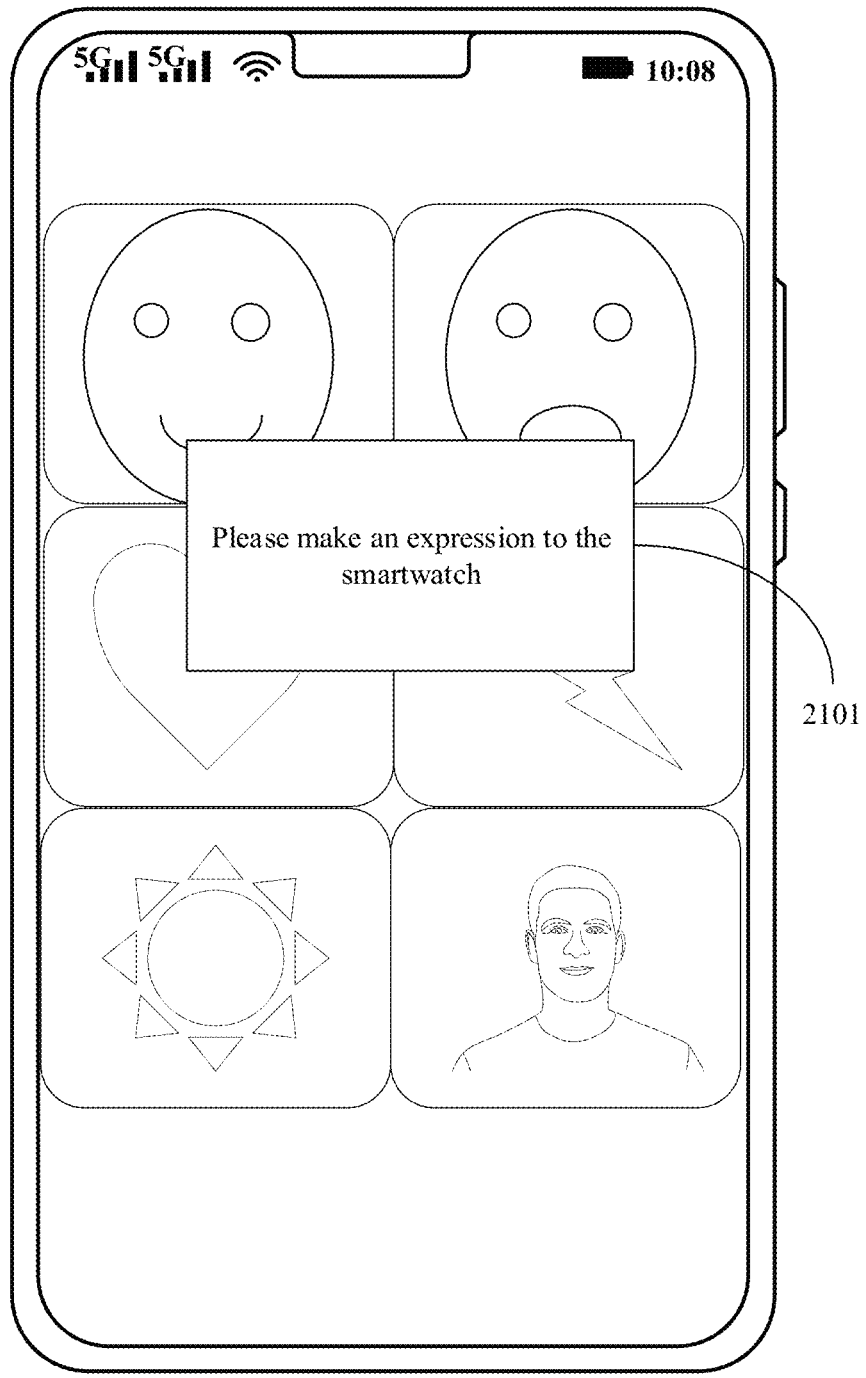
FIG. 21 is a diagram of a pop-up interface according to an embodiment of this application.

In a feasible implementation, in the foregoing implementation, the user may not know when to make an expression to the smartwatch. Therefore, after the depth-of-field mode is enabled, the mobile phone displays a pop-up interface including a prompt message, and the pop-up interface is used to prompt the user to make a facial expression to the smartwatch. Refer to FIG. 21. The pop-up interface includes a prompt message control 2101, and the prompt message control 2101 is used to display a prompt message, for example, "Please make an expression to the smartwatch". In this way, the user may move the face from the front of the mobile phone to the front of the smartwatch. In response to the acquisition instruction, the smartwatch acquires an expression corresponding to the user, and sends initial expression information to the server. In addition, after acquiring the expression corresponding to the user, the smartwatch may also display a pop-up interface including the prompt message on the watch-face interface, to prompt the user that acquisition is completed. In a feasible implementation, after receiving the target image sent by the mobile phone and the initial expression information sent by the smartwatch, the server needs to determine that there is an association relationship between the target image and the initial expression information, to execute a subsequent rendering task. Therefore, the mobile phone may further send corresponding device information to the server, and the smartwatch may also send corresponding device information to the server. The device information may include a media access control (media access control, MAC) address corresponding to a device, communication connection information, and the like. In this way, based on the device information corresponding to the mobile phone and the smartwatch, the server may determine that there is an association relationship between the mobile phone and the smartwatch and execute a rendering task.

It may be understood that a process in which the mobile phone displays the pop-up interface including the prompt message may be after the depth-of-field mode is detected to be enabled, or may be after the acquisition instruction is sent to the smartwatch. An execution sequence of the steps is not specifically limited in this embodiment of this application.

In another possible implementation, the mobile phone may send the target image and device information corresponding to the associated device to the server, where the device information may include device information corresponding to the smartwatch associated with the mobile phone. The smartwatch may alternatively send expression information and device information corresponding to an associated device to the server, where the device information may include device information corresponding to the mobile phone associated with the smartwatch. In this way, the server may execute a subsequent rendering task based on the received target image and the received expression information.

In some other embodiments, the mobile phone may alternatively send the target image and the acquisition instruction together to the smartwatch. In response to the acquisition instruction, the smartwatch acquires an expression corresponding to the user, and sends the target image and the first expression image to the server. A specific implementation of this application is not specifically limited in this embodiment of this application.

In this embodiment of this application, step S2004 to step S2006 are similar to step S703 to step S705 in the method shown in FIG. 7, and details are not described herein again.

In some embodiments, the display method for a watch-face interface provided in this embodiment of this application may be further applied to a multi-person scenario. For example, the target image selected by the user wearing the smartwatch may include a plurality of faces. In addition, in a process in which the smartwatch acquires a facial expression of the user, the user wearing the smartwatch may make a facial expression together with a plurality of other users. For example, the target image includes two faces, and there is only one user wearing the smartwatch in front of the smartwatch. In this case, in the watch-face interface that includes the dynamic-effect image and that is displayed by the smartwatch, two faces or one face in the dynamic-effect image may execute an expression type corresponding to the user. For another example, the target image includes two faces, and there are two users in front of the smartwatch. In this case, in the watch-face interface that includes the dynamic-effect image and that is displayed by the smartwatch, two faces in the dynamic-effect image may execute expression types corresponding to the two users respectively. For example, an expression type of a first user is smile, and an expression type of a second user is sadness. Then, one face in the two faces in the dynamic-effect image may execute the expression type of smile and the other may execute the expression type of sadness. For another example, the target image includes two faces, and there are a plurality of users in front of the smartwatch. In this case, when the smartwatch displays the watch-face interface including the dynamic-effect image, the smartwatch may identify two users in the plurality of users in real time, and the two faces in the dynamic-effect image respectively execute expression types corresponding to the two users. Therefore, when displaying the watch-face interface including the dynamic-effect image, the smartwatch may interact with a plurality of users and is not limited to interacting with only one user, thereby implementing diversity and personalization of the watch-face interface of the smartwatch. This increases interest and improves user experience.

In some other embodiments, the smartwatch may further create, based on an acquired action of the user and/or an item held by the user and a selected static target image, a dynamic watch-face interface that includes the dynamic-effect image and that corresponds to the preset working mode. For example, the action of the user may include a rotation action of the user's head, a hand action of the user at a position close to the face, and the like. This is not limited to generating and setting a dynamic watch-face interface corresponding to a watch face of the smartwatch only based on a facial expression type of the user. In this way, diversification and personalization of the watch-face interface of the smartwatch is implemented.

In this embodiment of this application, the smartwatch may acquire expression images corresponding to a plurality of expression types of the user, and the server may generate dynamic-effect images respectively corresponding to the plurality of different expression types of the user. In some other embodiments, the dynamic-effect image generated by the server may further correspond to a set user. The server may generate dynamic-effect images respectively corresponding to different expression types of different users. For example, when an expression image acquired by the smartwatch includes the first user, the server may generate, based on initial expression information of the first user, a dynamic-effect image including an expression type corresponding to the first user, and set a user identifier for a dynamic-effect image corresponding to the first user. The user identifier represents the first user. Similarly, when the expression image acquired by the smartwatch includes the second user, the server may also set a user identifier for a dynamic-effect image corresponding to the second user. Different users correspond to different user identifiers. In this way, when displaying a corresponding watch-face interface, the smartwatch may perform user recognition on the acquired expression image in advance, and when the user is identified as the first user, a watch-face interface that includes the dynamic-effect image corresponding to the first user is displayed. When the user is identified as the second user, a watch-face interface including the dynamic-effect image corresponding to the second user is displayed.

In some solutions, a plurality of embodiments of this application may be combined, and a combined solution is implemented. Optionally, some operations in the procedures of the method embodiments are optionally combined, and/or a sequence of some operations is optionally changed. In addition, an execution sequence between steps of each procedure is merely an example, and does not constitute a limitation on an execution sequence between the steps. The steps may alternatively be performed in another execution sequence. This is not intended to indicate that the execution sequence is the only sequence in which these operations can be performed. A person of ordinary skill in the art may think of a plurality of manners of re-sorting the operations described in embodiments of this application. In addition, it should be noted that process details related to an embodiment of this application are also applicable to another embodiment in a similar manner, or different embodiments may be used in combination.

In addition, some steps in the method embodiments may be equivalently replaced with other possible steps. Alternatively, some steps in the method embodiments may be optional, and may be deleted in some usage scenarios. Alternatively, another possible step may be added to the method embodiment.

In addition, the method embodiments may be implemented separately or in combination.

Figure 22:
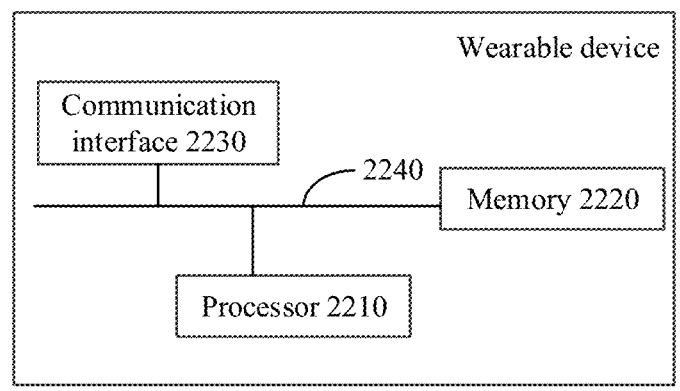
FIG. 22 is a diagram of a structure of a wearable device according to an embodiment of this application.

An embodiment of this application further provides a wearable device. For example, the wearable device may be the foregoing smartwatch. As shown in FIG. 22, the wearable device may include one or more processors 2210, a memory 2220, and a communication interface 2230.

The memory 2220 and the communication interface 2230 are coupled to the processor 2210. For example, the memory 2220 and the communication interface 2230 may be coupled to the processor 2210 by using the bus 2240.

The communication interface 2230 is configured to perform data transmission with another device. The memory 2220 stores computer program code. The computer program code includes computer instructions, and when the computer instructions are executed by the processor 2210, the wearable device is enabled to perform the display method for a watch-face interface in embodiments of this application.

The processor 2210 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content in the present disclosure. Alternatively, the processor may be a combination of processors implementing a computing function, for example, a combination of one or more microprocessors, or a combination of a DSP and a microprocessor.

The bus 2240 may be a peripheral component interconnect (PCI) bus, an extended industry standard architecture (EISA) bus, or the like. The bus 2240 may be classified into an address bus, a data bus, a control bus, and the like. For ease of representation, only one bold line is used for representation in FIG. 22, but this does not indicate that there is only one bus or only one type of bus.

An embodiment of this application further provides an interaction system. The interaction system includes an electronic device, a wearable device, and a server. The interaction system is used to perform related method steps in the foregoing method embodiments.

An embodiment of this application further provides an interaction system. The interaction system includes a wearable device and a server. The interaction system is used to perform related method steps in the foregoing method embodiments.

An embodiment of this application further provides an electronic device. The electronic device includes a memory and one or more processors. The memory is coupled to the processor. The memory stores computer program code, and the computer program code includes computer instructions. When the computer instructions are executed by the processor, the electronic device is enabled to perform related method steps in the foregoing method embodiments.

An embodiment of this application further provides a computer-readable storage medium. The computer-readable storage medium stores computer program code. When the processor executes the computer program code, an electronic device performs related method steps in the foregoing method embodiments.

An embodiment of this application further provides a computer program product. When the computer program product runs on a computer, the computer is enabled to perform related method steps in the foregoing method embodiments.

The wearable device, the computer storage medium, or the computer program product provided in this application is configured to perform corresponding methods provided above. Therefore, for beneficial effects that can be achieved by the wearable device, the computer storage medium, or the computer program product, refer to beneficial effects of the corresponding methods provided above. Details are not described herein again.

The foregoing descriptions about implementations allow a person skilled in the art to clearly understand that, for the purpose of convenient and brief description, division of the foregoing functional modules is used as an example for illustration. In actual application, the foregoing functions can be allocated to different functional modules for implementation as required. That is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part making a contribution, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A display method for a watch-face interface, applied to an interaction system, wherein the interaction system comprises a wearable device, an electronic device, and a server, the wearable device is configured to display a watch-face interface, and the method comprises:
    acquiring, by the electronic device, a first expression image of a user in response to a first trigger operation;
    obtaining, by the electronic device, a target image;
    sending, by the electronic device, an image generation request to the server, wherein the image generation request comprises the target image and initial expression information of the first expression image, and the initial expression information represents an expression type of the first expression image;
    generating, by the server, a dynamic-effect file corresponding to the target image in response to the image generation request, wherein the dynamic-effect file comprises a dynamic-effect image obtained by rendering the target image based on the initial expression information, and dynamic effect of the dynamic-effect image matches the expression type of the first expression image;
    sending, by the server, the dynamic-effect file to the wearable device; and
    displaying, by the wearable device, a corresponding watch-face interface based on an acquired second expression image after detecting a second trigger operation, wherein the watch-face interface comprises the dynamic-effect image that matches an expression type of the second expression image.

2. The method according to claim 1, wherein the displaying, by the wearable device, a corresponding watch-face interface based on an acquired second expression image after detecting a second trigger operation comprises:
    acquiring, by the wearable device, the second expression image of the user after detecting the second trigger operation;
    recognizing, by the wearable device, the expression type of the second expression image; and
    displaying, by the wearable device, the corresponding watch-face interface based on target expression information, wherein the target expression information represents the expression type of the second expression image.

3. The method according to claim 2, wherein the displaying, by the wearable device, a corresponding watch-face interface based on an acquired second expression image comprises:
    comparing the target expression information of the second expression image with effect information of the dynamic-effect image, wherein the effect information represents an expression type in the dynamic-effect image; and
    displaying a watch-face interface comprising the dynamic-effect image if the target expression information of the second expression image matches the effect information of the dynamic-effect image.

4. The method according to claim 3, wherein the target expression information and the effect information comprise feature point information, and the comparing, by the wearable device, the target expression information of the second expression image with effect information of the dynamic-effect image comprises:
    comparing, by the wearable device, the feature point information of the target expression information with the feature point information of the effect information, wherein the feature point information represents an expression feature corresponding to an expression type; and
    the displaying a watch-face interface comprising the dynamic-effect image if the target expression information of the second expression image matches the effect information of the dynamic-effect image comprises:
    if the feature point information of the target expression information matches the feature point information of the effect information, determining that the target expression information of the second expression image matches the effect information of the dynamic-effect image, and displaying the watch-face interface comprising the dynamic-effect image.

5. The method according to claim 3, wherein the target expression information and the effect information comprise expression type identifiers, and the comparing, by the wearable device, the target expression information of the second expression image with effect information of the dynamic-effect image comprises:
    comparing, by the wearable device, the expression type identifier of the target expression information with the expression type identifier of the effect information; and
    the displaying a watch-face interface comprising the dynamic-effect image if the target expression information of the second expression image matches the effect information of the dynamic-effect image comprises:
    if the expression type identifier of the target expression information matches the expression type identifier of the effect information, determining that the target expression information of the second expression image matches the effect information of the dynamic-effect image, and displaying the watch-face interface comprising the dynamic-effect image.

6. The method according to claim 4, wherein the method further comprises:
    displaying a watch-face interface comprising the target image if the target expression information of the second expression image does not match the effect information of the dynamic-effect image.

7. The method according to claim 1, wherein the second trigger operation comprises a screen-on operation, and the screen-on operation comprises: the user lifts a wrist wearing the wearable device to the front of the user's face, or the user lifts a wrist wearing the wearable device and the user lowers the head.

8. An interaction system, wherein the interaction system comprises an electronic device, a wearable device, and a server, wherein the wearable device is configured to display a watch-face interface, and the interaction system is configured to perform the display method comprises:
    acquiring, by the electronic device, a first expression image of a user in response to a first trigger operation;
    obtaining, by the electronic device, a target image;
    sending, by the electronic device, an image generation request to the server, wherein the image generation request comprises the target image and initial expression information of the first expression image, and the initial expression information represents an expression type of the first expression image;

generating, by the server, a dynamic-effect file corresponding to the target image in response to the image generation request, wherein the dynamic-effect file comprises a dynamic-effect image obtained by rendering the target image based on the initial expression information, and dynamic effect of the dynamic-effect image matches the expression type of the first expression image;

sending, by the server, the dynamic-effect file to the wearable device; and displaying, by the wearable device, a corresponding watch-face interface based on an acquired second expression image after detecting a second trigger operation, wherein the watch-face interface comprises the dynamic-effect image that matches an expression type of the second expression image.

9. The interaction system according to claim 8, wherein the displaying, by the wearable device, a corresponding watch-face interface based on an acquired second expression image after detecting a second trigger operation comprises:

acquiring, by the wearable device, the second expression image of the user after detecting the second trigger operation;

recognizing, by the wearable device, the expression type of the second expression image; and displaying, by the wearable device, the corresponding watch-face interface based on target expression information, wherein the target expression information represents the expression type of the second expression image.

10. The method according to claim 9, wherein the displaying, by the wearable device, a corresponding watch-face interface based on an acquired second expression image comprises:

comparing the target expression information of the second expression image with effect information of the dynamic-effect image, wherein the effect information represents an expression type in the dynamic-effect image; and displaying a watch-face interface comprising the dynamic-effect image if the target expression information of the second expression image matches the effect information of the dynamic-effect image.

11. The method according to claim 10, wherein the target expression information and the effect information comprise feature point information, and the comparing, by the wearable device, the target expression information of the second expression image with effect information of the dynamic-effect image comprises:

comparing, by the wearable device, the feature point information of the target expression information with the feature point information of the effect information, wherein the feature point information represents an expression feature corresponding to an expression type; and the displaying a watch-face interface comprising the dynamic-effect image if the target expression information of the second expression image matches the effect information of the dynamic-effect image comprises:

if the feature point information of the target expression information matches the feature point information of the effect information, determining that the target expression information of the second expression image matches the effect information of the dynamic-effect image, and displaying the watch-face interface comprising the dynamic-effect image.

12. The method according to claim 10, wherein the target expression information and the effect information comprise expression type identifiers, and the comparing, by the wearable device, the target expression information of the second expression image with effect information of the dynamic-effect image comprises:

comparing, by the wearable device, the expression type identifier of the target expression information with the expression type identifier of the effect information; and the displaying a watch-face interface comprising the dynamic-effect image if the target expression information of the second expression image matches the effect information of the dynamic-effect image comprises:

if the expression type identifier of the target expression information matches the expression type identifier of the effect information, determining that the target expression information of the second expression image matches the effect information of the dynamic-effect image, and displaying the watch-face interface comprising the dynamic-effect image.

13. The method according to claim 11, wherein the method further comprises:

displaying a watch-face interface comprising the target image if the target expression information of the second expression image does not match the effect information of the dynamic-effect image.

14. The method according to claim 8, wherein the second trigger operation comprises a screen-on operation, and the screen-on operation comprises: the user lifts a wrist wearing the wearable device to the front of the user's face, or the user lifts a wrist wearing the wearable device and the user lowers the head.

15. The method according to claim 8, wherein the first trigger operation comprises an enabling operation of the user for a preset working mode of the electronic device, and the preset working mode is used by the electronic device to set a watch-face interface that corresponds to the wearable device and that comprises the dynamic-effect image.

16. The method according to claim 8, wherein the method further comprises:

displaying a corresponding watch-face interface based on a device status of the wearable device if the device status of the wearable device is a tilted state or a rotation state.

17. The method according to claim 16, wherein the method further comprises:

if the wearable device is in a tilted state, displaying the watch-face interface with tilt dynamic effect, wherein the dynamic-effect image on the watch-face interface presents a tilt change in a horizontal direction and/or a vertical direction within a preset angle.

18. The method according to claim 16, wherein the method further comprises:

if the wearable device is in a rotation state, displaying the watch-face interface with rotation dynamic effect, wherein the dynamic-effect image on the watch-face interface presents a rotation change in a clockwise direction or an anti-clockwise direction.

19. The method according to claim 8, wherein the displaying, by the wearable device, a corresponding watch-face interface based on an acquired second expression image after detecting a second trigger operation comprises:

displaying, by the wearable device, a corresponding watch-face interface with superimposed dynamic effect based on the acquired second expression image if the device status of the wearable device is not the tilted state or the rotation state; wherein the superimposed dynamic effect includes highlight dynamic effect and dynamic effect that matches the expression type of the second expression image, the dynamic-effect image on the watch-face interface presents a cyclic change from expansion to contraction and from contraction to expansion.

20. The method according to claim 8, wherein the displaying, by the wearable device, a corresponding watch-face interface based on an acquired second expression image after detecting a second trigger operation comprises:

displaying a watch-face interface with superimposed dynamic effect based on the acquired second expression image if the wearable device is in the tilted state, where the superimposed dynamic effect includes tilt dynamic effect and dynamic effect that matches the expression type of the second expression image; and the dynamic-effect image displayed on the watch-face interface presents a tilt change in a horizontal direction and/or a vertical direction within a preset angle; and displaying a watch-face interface with superimposed dynamic effect based on the acquired second expression image if the wearable device is in the rotation state, where the superimposed dynamic effect includes rotation dynamic effect and dynamic effect that matches the expression type of the second expression image; and the dynamic-effect image on the watch-face interface presents a rotation change in a clockwise direction or an anti-clockwise direction.

* * * * *